United States Patent
Choi et al.

(10) Patent No.: US 9,619,269 B2
(45) Date of Patent: Apr. 11, 2017

(54) DEVICE AND METHOD FOR DYNAMICALLY MAPPING PROCESSOR BASED ON TENANT

(71) Applicant: Electronics and Telecommunications Research Institute, Daejeon (KR)

(72) Inventors: Kang Il Choi, Daejeon (KR); Jong Geun Park, Daejeon (KR); Bhum Cheol Lee, Daejeon (KR); Sang Min Lee, Daejeon (KR); Jung Hee Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 13 days.

(21) Appl. No.: 14/737,663

(22) Filed: Jun. 12, 2015

(65) Prior Publication Data

US 2016/0154662 A1 Jun. 2, 2016

(30) Foreign Application Priority Data

Nov. 27, 2014 (KR) ........................ 10-2014-0167323

(51) Int. Cl.
*G06F 9/455* (2006.01)
*G06F 9/50* (2006.01)

(52) U.S. Cl.
CPC ........ *G06F 9/45558* (2013.01); *G06F 9/5077* (2013.01); *G06F 2009/45595* (2013.01)

(58) Field of Classification Search
CPC ................... G06F 9/45558; G06F 2009/45595
See application file for complete search history.

(56) References Cited

U.S. PATENT DOCUMENTS

| 2006/0195698 | A1 | 8/2006 | Pinkerton et al. |
| 2011/0283017 | A1* | 11/2011 | Alkhatib ............. H04L 12/4641 709/244 |
| 2013/0239119 | A1* | 9/2013 | Garg .................... G06F 9/5083 718/105 |
| 2014/0201738 | A1 | 7/2014 | Choi et al. |

FOREIGN PATENT DOCUMENTS

KR 1020070057636 A 6/2007

OTHER PUBLICATIONS

Shieh, A.; Kandula, S.; Greenberg, A.; Kim, C., "Seawall: Performance Isolation for Cloud Datacenter Networks" (2010), pp. 1-7 [retrieved from https://www.usenix.org/legacy/event/hotcloud10/tech/full_papers/Shieh.pdf].*
Rodrigues, H.; Santos, J.; Turner, Y.; Soares, P.; Guedes, D., "Gatekeeper: Supporting Bandwidth Guarantees for Multi-tenant Datacenter Networks" (2011), pp. 1-8 [retrieved from https://www.usenix.org/legacy/events/wiov11/tech/final_files/Rodrigues.pdf].*

* cited by examiner

*Primary Examiner* — Brian W Wathen
(74) *Attorney, Agent, or Firm* — William Park & Associates Ltd.

(57) ABSTRACT

Provided is a device and a method for providing network virtualization, in which a method of dynamically mapping a processor includes extracting tenant information on a tenant and information on a virtual machine (VM) generated by a Cloud OS or controller; classifying virtual machine queues (VMQs) and processors to process the VMQs by tenant, and dynamically mapping the VMQs onto the processors by tenant.

20 Claims, 24 Drawing Sheets

DEVICE AND METHOD FOR DYNAMICALLY MAPPING PROCESSOR BASED ON TENANT

CROSS-REFERENCE TO RELATED APPLICATION

This application claims the priority benefit of Korean Patent Application No. 10-2014-0167323, filed on Nov. 27, 2014, in the Korean Intellectual Property Office, the disclosure of which is incorporated herein by reference.

BACKGROUND

1. Field of the Invention

Embodiments of the present invention relate to a device and a method for providing network virtualization.

2. Description of the Related Art

A processing technique for speedup of network traffic in a network interface card (NIC) of a multiprocessor-based server system is constantly advancing. One of the most serious problems is that traffic received by the NIC is not effectively processed by a multiprocessor in a server.

A technology for resolving a Receive Side Scaling (RSS) problem in a virtualized environment is Virtual Machine Queue (VMQ). VMQ technology allows distributed processing of network traffic by a multiprocessor even in a virtualized environment using a method of generating a VMQ in an NIC and mapping each VMQ onto a processor in a host, making high-speed traffic processing possible.

FIG. 1 illustrates a configuration of conventional VMQ technology.

A server system sets a VMQ and assigns a processor to process the VMQ. The server system receives incoming packets input to a server through an NIC, classifies the packets based on L2 information, for example, destination media access control (MAC), and sends the packets to the VMQ. The processor to process the VMQ processes the packets sent to the VMQ and transmits the packets to a virtual machine through an L2 virtual switch, and the virtual machine processes the received packets.

Since VMQ technology statically assigns VMQs, a too small number of processors may be assigned to a plurality of queues which involve traffic congestion or a small number of queues which hardly use traffic may be assigned to a too large number of processors.

To solve a statistical assignment problem of VMQ, Dynamic Virtual Machine Queue (DVMQ) is provided. DVMQ technology is a method of dynamically assigning a VMQ to a multiprocessor based on network traffic amount and total use of a processor.

When network traffic amount or total use of a processor exceeds a set upper threshold, a multi-machine queue assigned to the processor needs dynamically reassigning. When the network traffic amount or total use of the processor is below a set lower threshold, the multi-machine queue assigned to the processor is dynamically reassigned to remove the processor from assigning, thereby optimizing network traffic processing performance and power consumption.

Meanwhile, network virtualization in a cloud system means ensuring that network traffic of virtual machines belonging to the same tenant is not affected by network traffic of virtual machines belonging to different tenants. However, conventional VMQ or DVMQ technology provides a technique for optimizing network processing performance and power consumption in a multiprocessor environment but does not consider a network virtualization technique required by the cloud system in the optimization process.

Thus, a method of providing network virtualization is needed which ensures that network traffic processing of virtual machines belonging to the same tenant is not affected by congestion in network traffic of virtual machines belonging to different tenants.

SUMMARY

An aspect of the present invention is to solve the foregoing problems of the conventional technology and thus to provide a network virtualization method which ensures that network traffic processing of VMs belonging to the same tenant is not affected by congestion in network traffic belonging to a different tenant.

According to an aspect of the present invention, there is provided a method of dynamically mapping a processor, the method including extracting tenant information on a tenant and information on a virtual machine (VM) generated by a Cloud OS or controller; classifying virtual machine queues (VMQs) and processors to process the VMQs by tenant; and dynamically mapping the VMQs onto the processors by tenant.

The dynamically mapping of the VMQs onto the processors by tenant may include dynamically mapping the processors to process the VMQs in proportion to a total number of VMQs belonging to the same tenant.

The dynamically mapping of the VMQs to the processors by tenant may include dynamically mapping the processors to process the VMQs in proportion to a total number of virtual CPUs of VMs belonging to the same tenant.

The method may further include generating an additional VM by the Cloud OS or controller; extracting additional tenant information on the additional VM and information on the additional VM; and dynamically remapping an additional VMQ onto a processor to process the additional VMQ based on the additional tenant information and the information on the additional VM.

The method may further include, when at least one VM is deleted by the Cloud OS or controller, extracting deleted tenant information and deleted VM information on the deleted VM; and dynamically remapping the previously mapped VMQs onto the processors by tenant based on the deleted tenant information and the deleted VM information.

When the processors are impossible to operate due to an increase in traffic use of a VM belonging to at least one tenant, the dynamically mapping of the VMQs onto the processors by tenant may include dynamically mapping a VMQ and a processor not used by at least one different tenant other than the tenant to which the processors impossible to operate belong.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
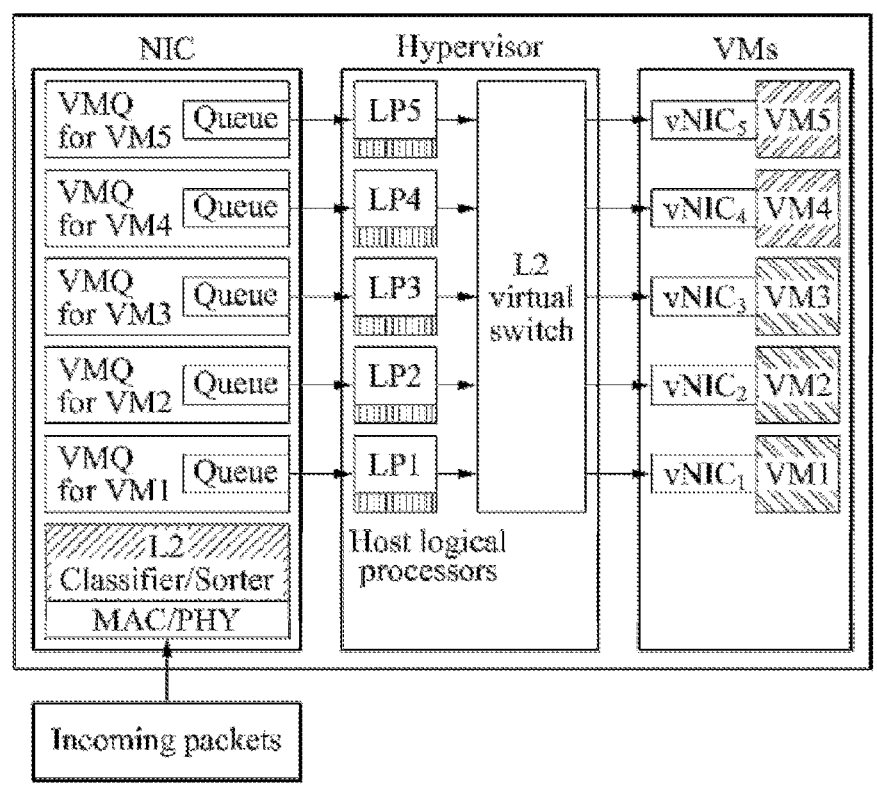
FIG. 1 illustrates a configuration of conventional Virtual Machine Queue (VMQ) technology.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

Hereinafter, a tenant-based dynamic processor mapping method and a tenant-based dynamic processor mapping device will be described in detail with reference to the accompanying drawings.

The following embodiments may be modified variously. The following embodiments are not intended to limit the present invention but are construed as including all changes, equivalents and substitutions thereof.

The terminology used herein is for the purpose of describing particular embodiments only and is not intended to limit the embodiments. As used herein, the singular forms are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description with reference to the accompanying drawings, like reference numerals denote like elements, and descriptions thereof will be omitted. When it is determined detailed description related to a related known technology may make the gist of the present invention unnecessarily ambiguous in describing the present invention, the detailed description will be omitted here.

The present invention relates to a device and a method for providing network virtualization and, more particularly, to a tenant-based dynamic processor mapping device and a tenant-based dynamic processor mapping method for a multi-tenant-based cloud server system to provide network virtualization.

Figure 2:
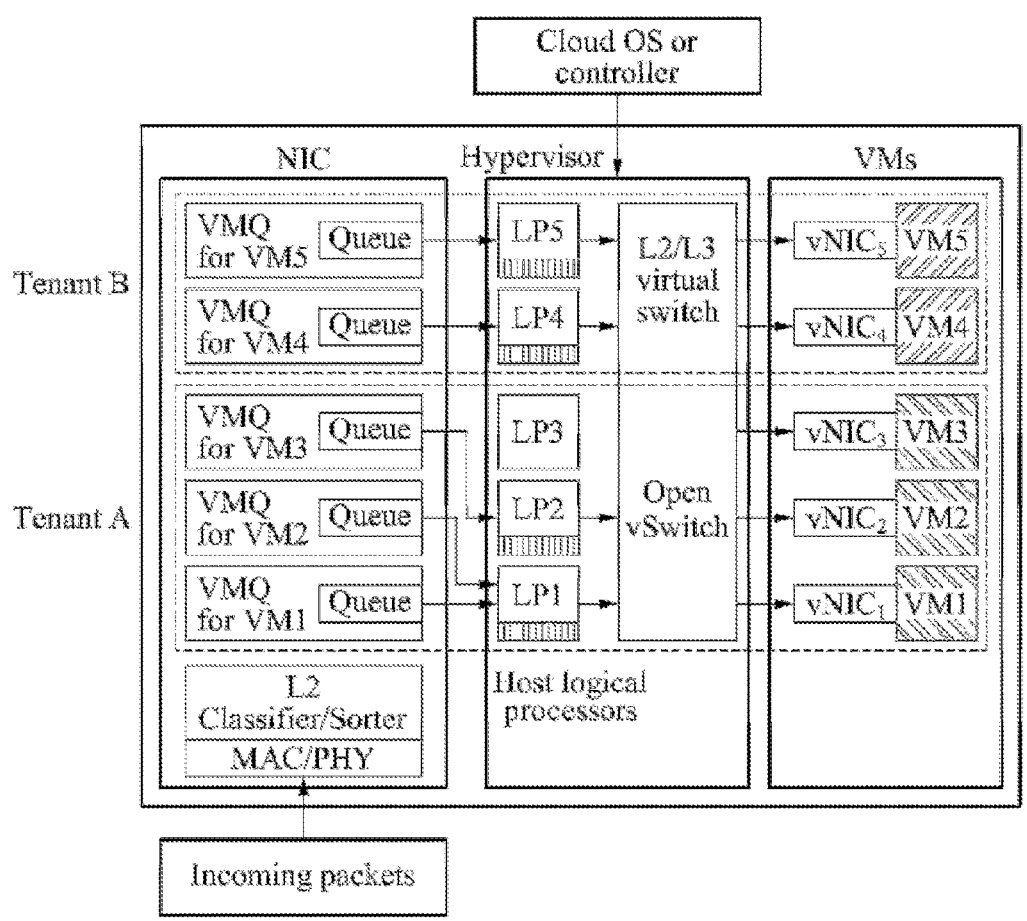
FIG. 2 illustrates a structural diagram of a tenant-based Dynamic Virtual Machine Queue (TDVMQ) according to an embodiment of the present invention.

FIG. 2 illustrates a structural diagram of a tenant-based Dynamic Virtual Machine Queue (TDVMQ) according to an embodiment of the present invention. More particularly, FIG. 2 illustrates the structural diagram of dynamically mapping virtual machine queues (VMQs) onto processors to process the VMQs in proportion to total numbers of virtual machines (VMs) belonging to the same tenants.

A cloud operating system (Cloud OS) or controller according to the embodiment of the present invention may generate tenant information and VM information and extract tenant information and VM information from a hypervisor or VM manager.

VMQs and processors to process the multiple queues are classified by tenant, and a VMQ belonging to each tenant may be dynamically mapped onto a multiprocessor belonging to the tenant.

Here, the VMQs and the processors to process the VMQs may dynamically be mapped onto each other in proportion to total numbers of VMs belonging to the same tenants.

For example, when VMs VM1, VM2 and VM3 belong to tenant A, VMs VM 4 and VM5 belong to tenant B and five processors to process VMQs are provided, a total of three VMs are present for tenant A and a total of two VMs are present for tenant B in total, and thus the VMQs and the processors to process the VMQs may dynamically be mapped at a ratio of tenant A to tenant B of 3:2. That is, among the processors to process a total of five VMQs, three processors may be mapped onto tenant A and two processors may be mapped onto tenant B in proportion to the total numbers of VMs belonging to the tenants.

In the foregoing situation, LP1, LP2 and LP3 may be mapped onto tenant A, wherein a VMQ for VM1 and a VMQ for VM2 of tenant A may be mapped onto LP1 and a VMQ for VM3 may be mapped onto LP2. No VMQ may be mapped onto LP3. Also, LP4 and LP5 may be mapped onto tenant B, wherein a VMQ for VM4 of tenant B may be mapped onto processor LP4 and a VMQ for VM5 may be mapped onto LP5.

According to the embodiment illustrated in FIG. 2, the server system may include a network interface card (NIC), a hypervisor, and a plurality of VMs.

First, the NIC may include a media access control (MAC)/physical layer (PHY) processor, a layer 2 (L2) classifier/sorter, and VMQs. The hypervisor may include processors to process the VMQs and virtual switches. The VMs may be generated by the Cloud OS through the hypervisor and have virtual network interfaces (vNICs).

The server system sets a VMQ by tenant generated by the Cloud OS or controller and assigns a processor to process the VMQ. The server system receives incoming packets input to the server through the NIC, classifies the incoming packets based on L2 information, for example, destination MAC, and sends the packets to the VMQ.

The processor to process the VMQ processes the incoming packets and transmits the packets to a VM through an L2 virtual switch. The VM may process the received packets.

Table 1 illustrates a VMQ/LP mapping table which dynamically maps VMQs onto processors to process the VMQs in proportion to total numbers of VMs belonging to the same tenants.

TABLE 1

| Tenant | Virtual Machine Queue | Logical Processor |
|---|---|---|
| Tenant A | VMQ1 | LP1 |
|  | VMQ2 | LP1 |
|  | VMQ3 | LP2 |
|  | None | LP3 |
| Tenant B | VMQ4 | LP4 |
|  | VMQ5 | LP5 |

Figure 3:
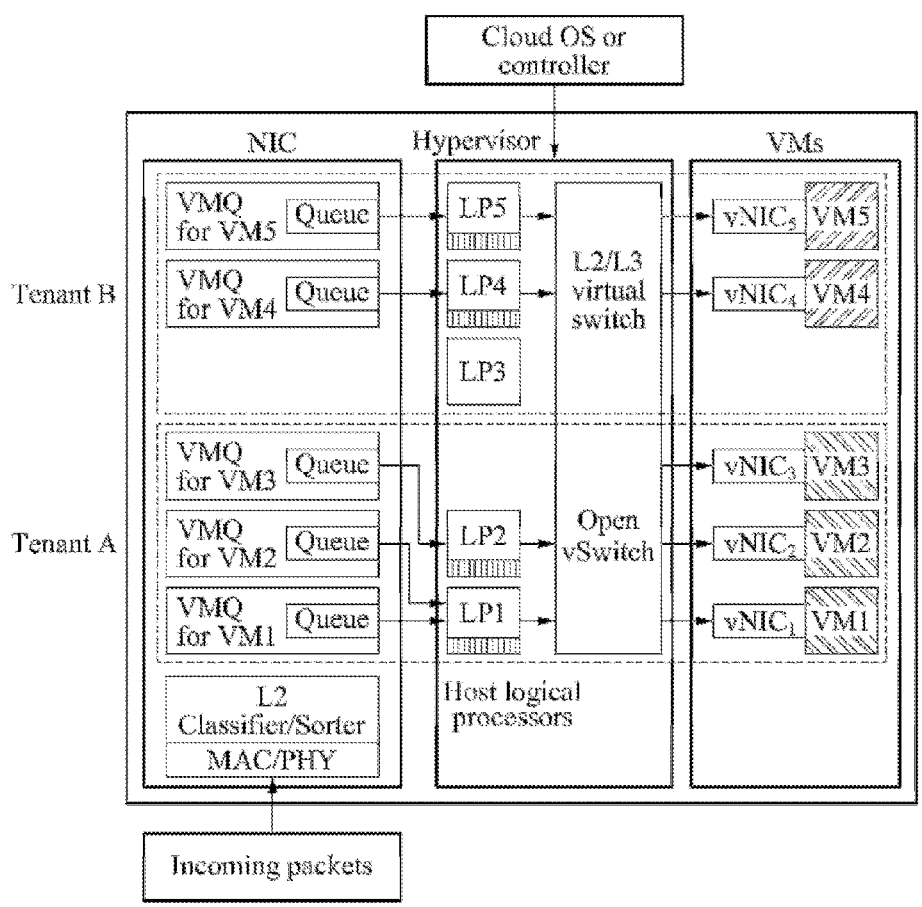
FIG. 3 illustrates a structural diagram of a TDVMQ according to another embodiment of the present invention.

FIG. 3 illustrates a structural diagram of a TDVMQ according to another embodiment of the present invention.

In the embodiment, VMQs and processors to process the VMQs may dynamically be mapped onto each other in proportion to total numbers of virtual CPUs (vCPUs) used for VMs belonging to the same tenants.

For instance, a case will be described where VM1, VM2 and VM3 belong to tenant A and individually use four vCPUs, VM4 and VM5 belong to tenant B and individually use nine vCPUs, and five processors to process VMQs are provided.

Since tenant A uses a total of 12 (3×4) vCPUs and tenant B uses a total of 18 (2×9) vCPUs, VMQs and processors to process the VMQs may dynamically be mapped at a ratio of tenant A to tenant B of 2:3. That is, among the processors to process a total of five VMQs, two processors may dynamically be mapped onto tenant A and three processors may dynamically be mapped onto in proportion to the total numbers of vCPUs belonging to the tenants.

In the foregoing situation, LP1 and LP2 may be mapped onto tenant A, wherein a VMQ for VM1 and a VMQ for VM2 of tenant A may be mapped onto processor LP1 and a VMQ for VM3 may be mapped onto LP2. Also, LP3, LP4 and LP may be mapped onto tenant B, wherein a VMQ for VM4 of tenant B may be mapped onto processor LP4, a VMQ for VM5 may be mapped onto LP5, and no VMQ may be mapped onto LP3.

Table 2 illustrates a VMQ/LP mapping table which dynamically maps VMQs onto processors to process the VMQs in proportion to total numbers of virtual CPUs used for VMs belonging to the same tenants.

TABLE 2

| Tenant | Virtual Machine Queue | Logical Processor |
|---|---|---|
| Tenant A | VMQ1 | LP1 |
|  | VMQ2 | LP1 |
|  | VMQ3 | LP2 |
| Tenant B | VMQ4 | LP4 |
|  | VMQ5 | LP5 |
|  | None | LP3 |

Figure 4:
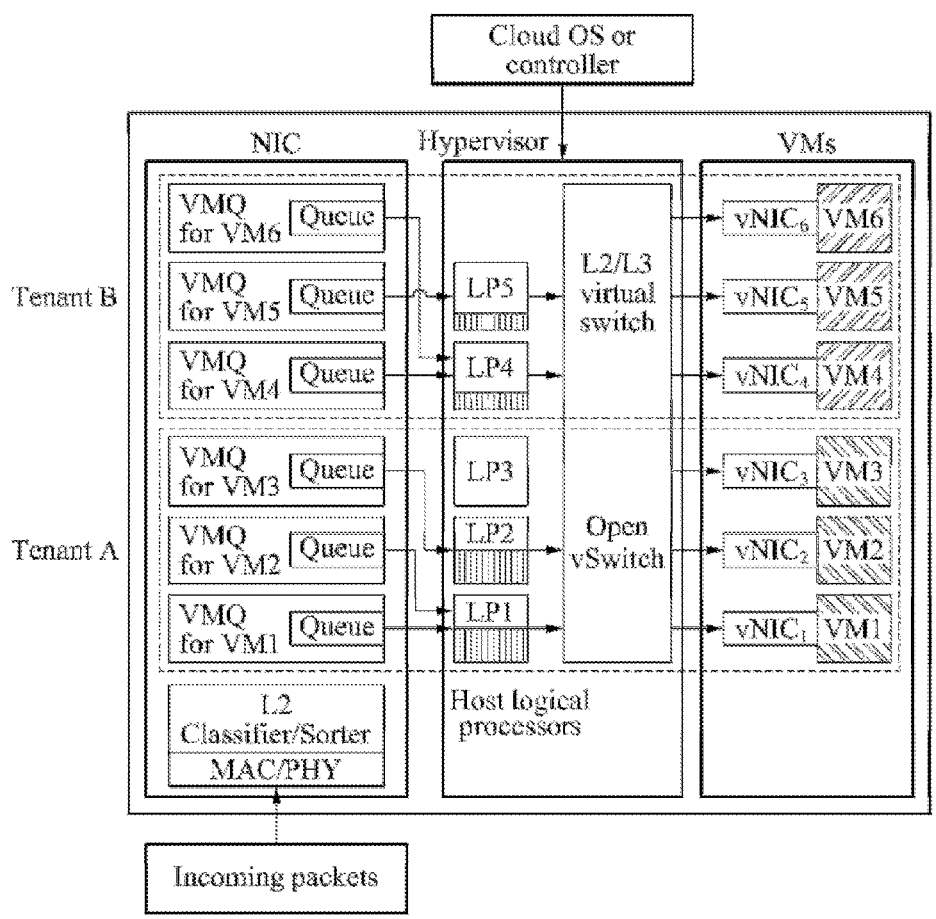
FIG. 4 illustrates a structural diagram of a VM6-added TDVMQ according to an embodiment of the present invention.

FIG. 4 illustrates a structural diagram of a VM6-added TDVMQ according to an embodiment of the present invention.

In the embodiment, when a new VM is generated by the Cloud OS or controller, information on the generated VM and tenant information are extracted from the hypervisor or VM manager and a VMQ and a processor to process the VMQ may dynamically be added to a preset mapping for a corresponding tenant based on the extracted tenant information and information on the VM.

Here, VMQs may dynamically be remapped onto processors to process the VMQs in proportion to total numbers of VMs belonging to the same tenants. Alternatively, the VMQs may dynamically be mapped onto the processors to process the VMQs in proportion to total numbers of virtual CPUs used by VMs belonging to the same tenants.

Table 3 illustrates a modification of the VMQ/LP mapping table when VM VM6 belonging to tenant B is generated in the structure shown in FIG. 2.

TABLE 3

| Tenant | Virtual Machine Queue | Logical Processor |
|---|---|---|
| Tenant A | VMQ1 | LP1 |
|  | VMQ2 | LP1 |
|  | VMQ3 | LP2 |
| Tenant B | VMQ4 | LP4 |
|  | VMQ5 | LP5 |
|  | None | LP3 |

Figure 5:
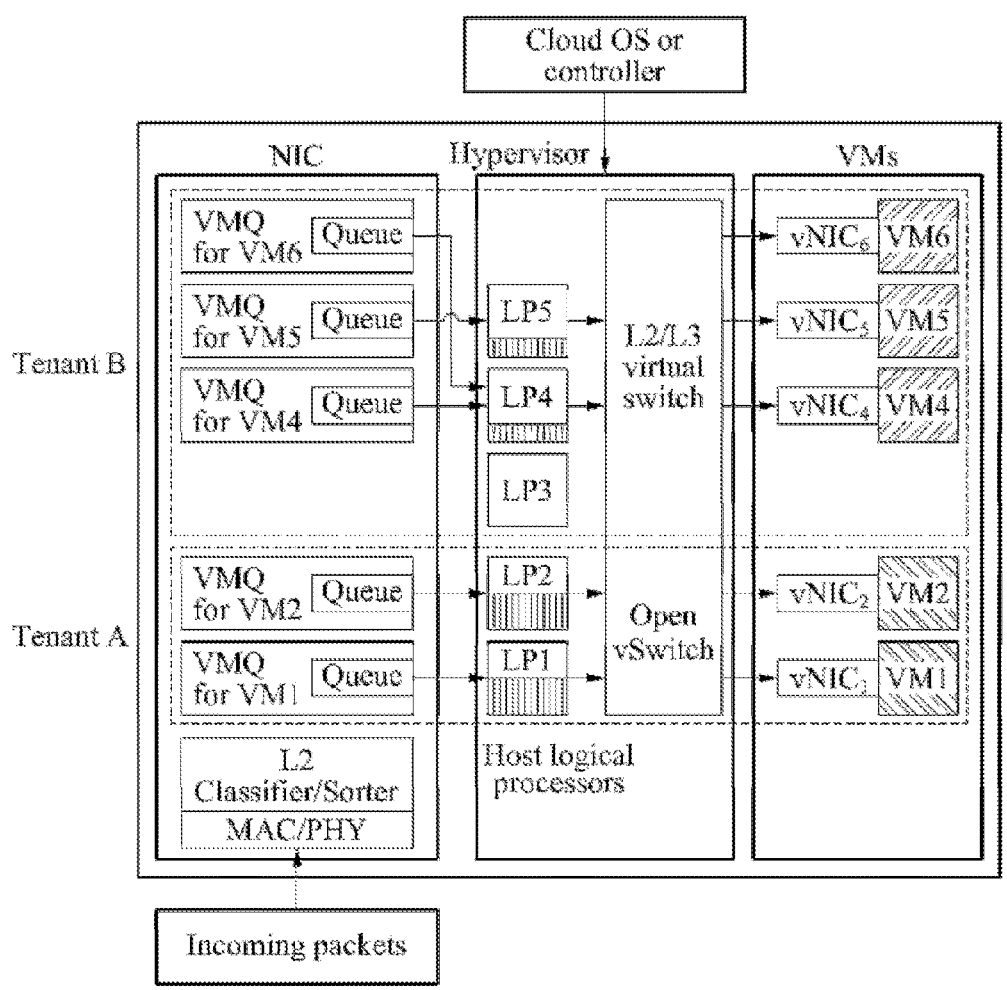
FIG. 5 illustrates a structural diagram of a VM3-deleted TDVMQ according to an embodiment of the present invention.

FIG. 5 illustrates a structural diagram of a VM3-deleted TDVMQ according to an embodiment of the present invention.

In the embodiment, when a new VM is deleted by the Cloud OS or controller, information on the deleted VM and tenant information are extracted from the hypervisor or VM manager and a VMQ and a processor to process the VMQ may dynamically be deleted from a mapping already assigned for a corresponding tenant based on the extracted tenant information.

Here, VMQs may dynamically be remapped onto processors to process the VMQs in proportion to total numbers of VMs belonging to the same tenants. Alternatively, the VMQs may dynamically be mapped onto the processors to process the VMQs in proportion to total numbers of virtual CPUs used by VMs belonging to the same tenants.

FIG. 5 illustrates an example of dynamically remapping VMQs and processors to process the VMQs in proportion to total numbers of VMs belonging to the same tenants.

When VM VM3 belonging to tenant A is deleted in the foregoing structure of FIG. 4, the VMQ/LP mapping table may be modified as in Table 4.

TABLE 4

| Tenant | Virtual Machine Queue | Logical Processor |
|---|---|---|
| Tenant A | VMQ1 | LP1 |
|  | VMQ2 | LP2 |
| Tenant B | None | LP3 |
|  | VMQ4 | LP4 |
|  | VMQ5 | LP5 |
|  | VMQ6 | LP4 |

As a ratio of a total number of VMs belonging to tenant A to a total number of VMs belonging to tenant B is changed to 2:3 due to deletion of VM3, the VMQs and the processors to process the VMQs may dynamically be remapped onto each other in proportion to the total numbers of VMs belonging to the same tenants. In addition, the VMQs and the processors to process the VMQs may also be dynamically mapped onto each other in proportion to the total numbers of virtual CPUs for VMs belonging to the same tenants.

Figure 6:
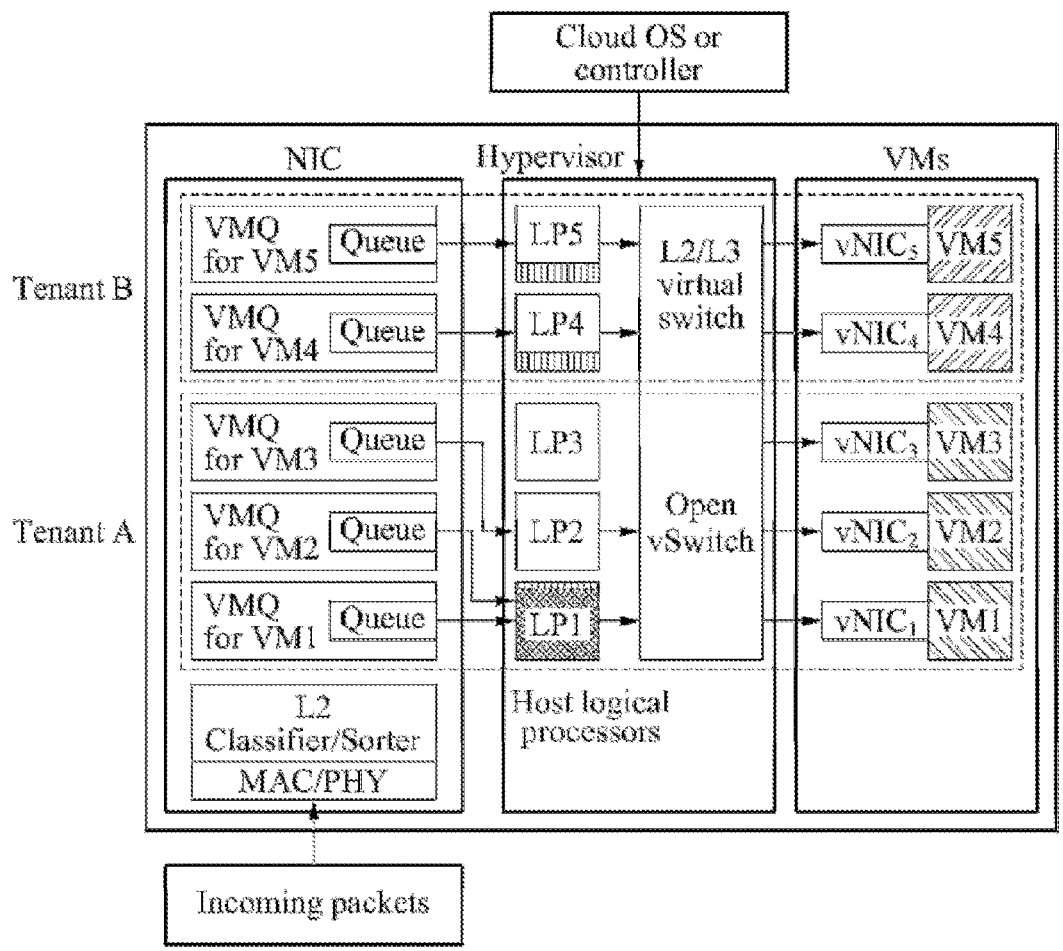
FIG. 6 illustrates a state that a TDVMQ spreading process is necessary according to an embodiment of the present invention.

FIG. 6 illustrates a state that a TDVMQ spreading process is necessary according to an embodiment of the present invention.

In the embodiment, as shown in FIG. 6, when traffic with respect to VMQ1 and VMQ2 increases to reach a TDVMQ upper threshold predetermined by processor LP1, the TDVMQ spreading process may be performed.

When the VMQ/LP mapping table is dynamically changed to provide a network virtualization function, VMQs belonging to the same tenant may be mapped restrictively onto a processor (LP) belonging to the tenant.

As a result of performing the TDVMQ spreading process, a VMQ/LP mapping table for VM1, VM2 and VM3 is changed so that the system may be set to have overall superior performance.

Table 5 illustrates a modification of VMQ/LP mapping table resulting from the TDVMQ spreading process, wherein VMQ VMQ1 is mapped onto processor LP1 and VMQs VMQ2 and VMQ3 are mapped onto processor LP2.

TABLE 5

| Tenant | Virtual Machine Queue | Logical Processor |
|---|---|---|
| Tenant A | VMQ1 | LP1 |
|  | VMQ2 | LP2 |
|  | VMQ3 | LP2 |
|  | None | LP3 |
| Tenant B | VMQ4 | LP4 |
|  | VMQ5 | LP5 |

Figure 7A:
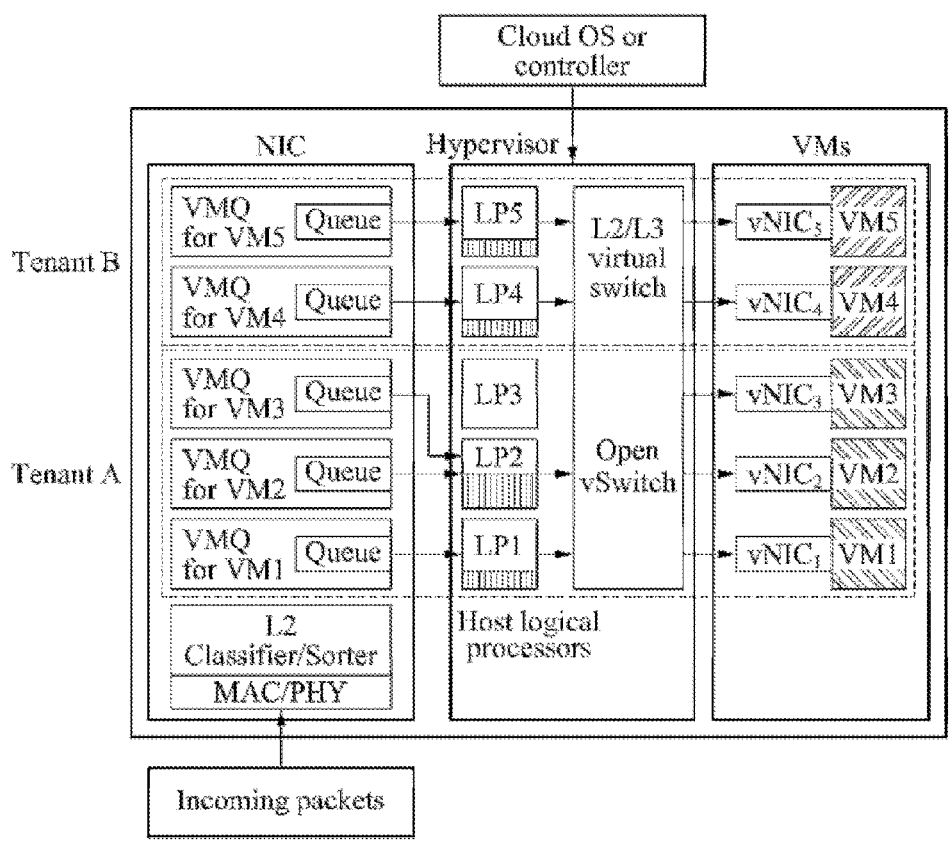
FIGS. 7A and 7B illustrate a state after a TDVMQ spreading process and a TDVMQ coalescing process are performed according to an embodiment of the present invention.
Figure 7B:
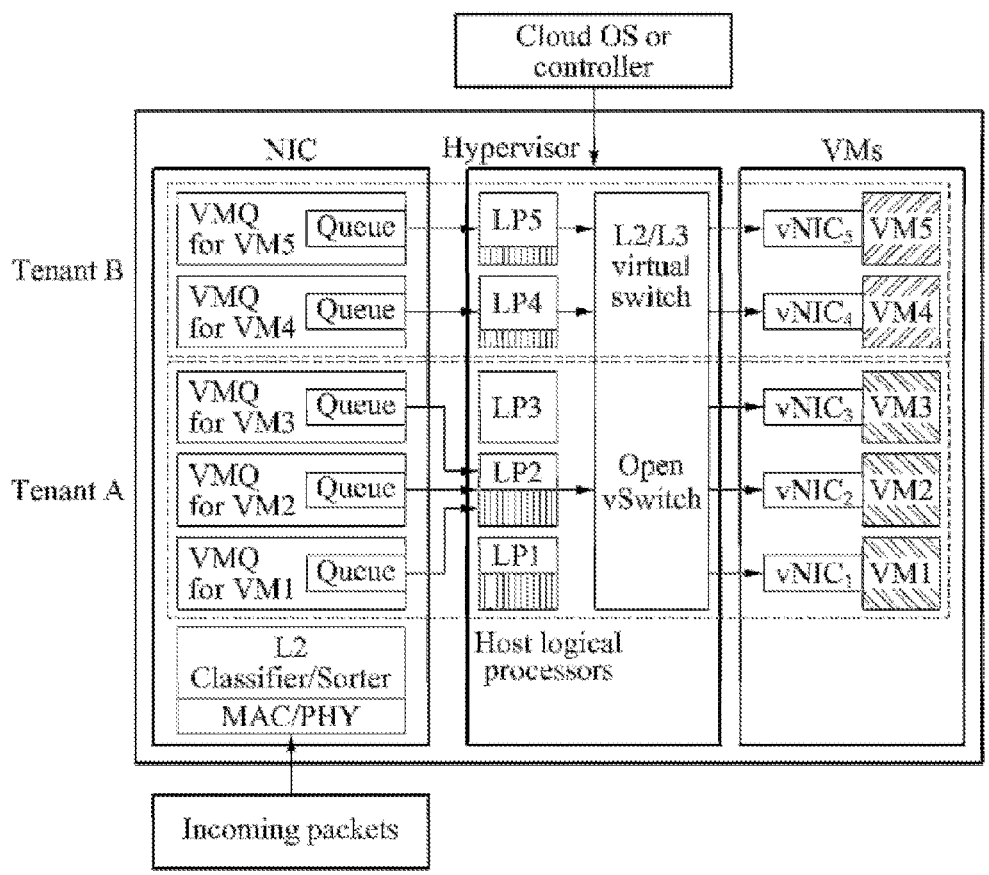

FIGS. 7A and 7B illustrate a state after a TDVMQ spreading process and TDVMQ coalescing process are performed according to an embodiment of the present invention.

FIG. 7A illustrates a structure of the system after the VMQ/LP mapping table is dynamically changed as in Table 5.

In the embodiment of the structure in FIG. 7A, when traffic with respect to VMQ1 decreases to exceed a TDVMQ lower threshold predetermined by processor LP1, the TDVMQ coalescing process may be performed.

When the VMQ/LP mapping table is dynamically changed to provide a network virtualization function, VMQs belonging to the same tenant may be mapped restrictively onto a processor (LP) belonging to the tenant.

In the embodiment of FIG. 7B, as a result of performing the TDVMQ coalescing process, the VMQ/LP mapping table for VM1, VM2 and VM3 is changed so that the system may be set to have overall lower power consumption.

Table 6 illustrates a modification of the VMQ/LP mapping table resulting from the TDVMQ coalescing process. All the VMQs VMQ1, VMQ2 and VMQ3 are mapped onto processor LP2 and processor LP1 enters an idle state.

TABLE 6

| Tenant | Virtual Machine Queue | Logical Processor |
|---|---|---|
| Tenant A | VMQ1 | LP2 |
|  | VMQ2 | LP2 |
|  | VMQ3 | LP2 |
|  | None | LP1, LP3 |
| Tenant B | VMQ4 | LP4 |
|  | VMQ5 | LP5 |

Figure 8:
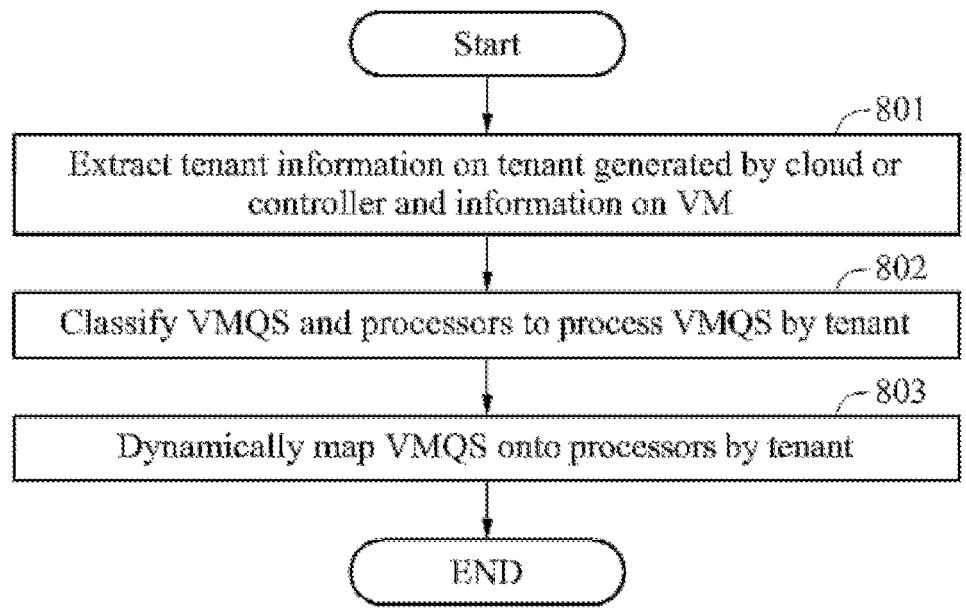
FIG. 8 is a flowchart illustrating a tenant-based dynamic processor mapping method according to an embodiment of the present invention.

FIG. 8 is a flowchart illustrating a tenant-based dynamic processor mapping method according to an embodiment of the present invention.

The Cloud OS or controller may generate a tenant. To generate VMs for the tenant, the Cloud OS may transmit a command to the hypervisor, and the hypervisor receiving the command may generate VMs.

Referring to FIG. 8, in operation 801, tenant information on the tenant generated by the Cloud OS or controller and information on the VMs may be extracted.

In operation 802, VMQs and processors to process the VMQs may be classified for each generated tenant.

In operation 803, the VMQs may dynamically be mapped onto the processors for each tenant.

In the embodiment, when the hypervisor dynamically maps the VMQs, VMQs belonging to the same tenant may be set to be mapped onto the same processor. Alternatively, the VMQs may be mapped by a conventional VMQ mapping method.

Also, the VMQs and the processors to process the VMQs may dynamically be mapped onto each other in proportion to total numbers of VMs belonging to the same tenants. Alternatively, the VMQs and the processors to process the VMQs may dynamically be mapped onto each other in proportion to total numbers of virtual CPUs (vCPUs) used for VMs belonging to the same tenants.

A method of dynamically mapping VMQs and processors in each tenant may conform to a conventional DVMQ manner. To support network virtualization by removing interference between different tenants, when VMQ/LP mapping is dynamically changed, VMQs belonging to the same tenant may be mapped restrictively onto a processor (LP) belonging to the tenant.

In one embodiment, when a new VM is generated by the Cloud OS or controller, information on the generated VM and tenant information are extracted from the hypervisor or VM manager and a VMQ and a processor to process the VMQ may dynamically be added to a preset mapping for each tenant based on the extracted tenant information and information on the VM.

In another embodiment, when a new VM is deleted by the Cloud OS or controller, information on the deleted VM and tenant information are extracted from the hypervisor or VM manager and a VMQ and a processor to process the VMQ may dynamically be deleted from a preset mapping for each tenant based on the extracted tenant information.

In the dynamic processor mapping method according to the embodiment, for optimization of network traffic processing performance, when traffic use of VMs belonging to a tenant increases so that processors in the same tenant do not perform processing any more, VMQs and processors to process the VMQs may dynamically mapped onto each other so as to extend to a processor not used by another tenant. To this end, a TDVMQ spreading process may be performed.

For minimization of power consumption, when traffic use of VMs belonging to one tenant decreases so that a margin for reducing processors belonging to the same tenant occurs, VMQs and processors to process the VMQs may dynamically mapped onto each other so that another tenant may use the processors. To this end, a TDVMQ coalescing process may be performed.

Figure 9:
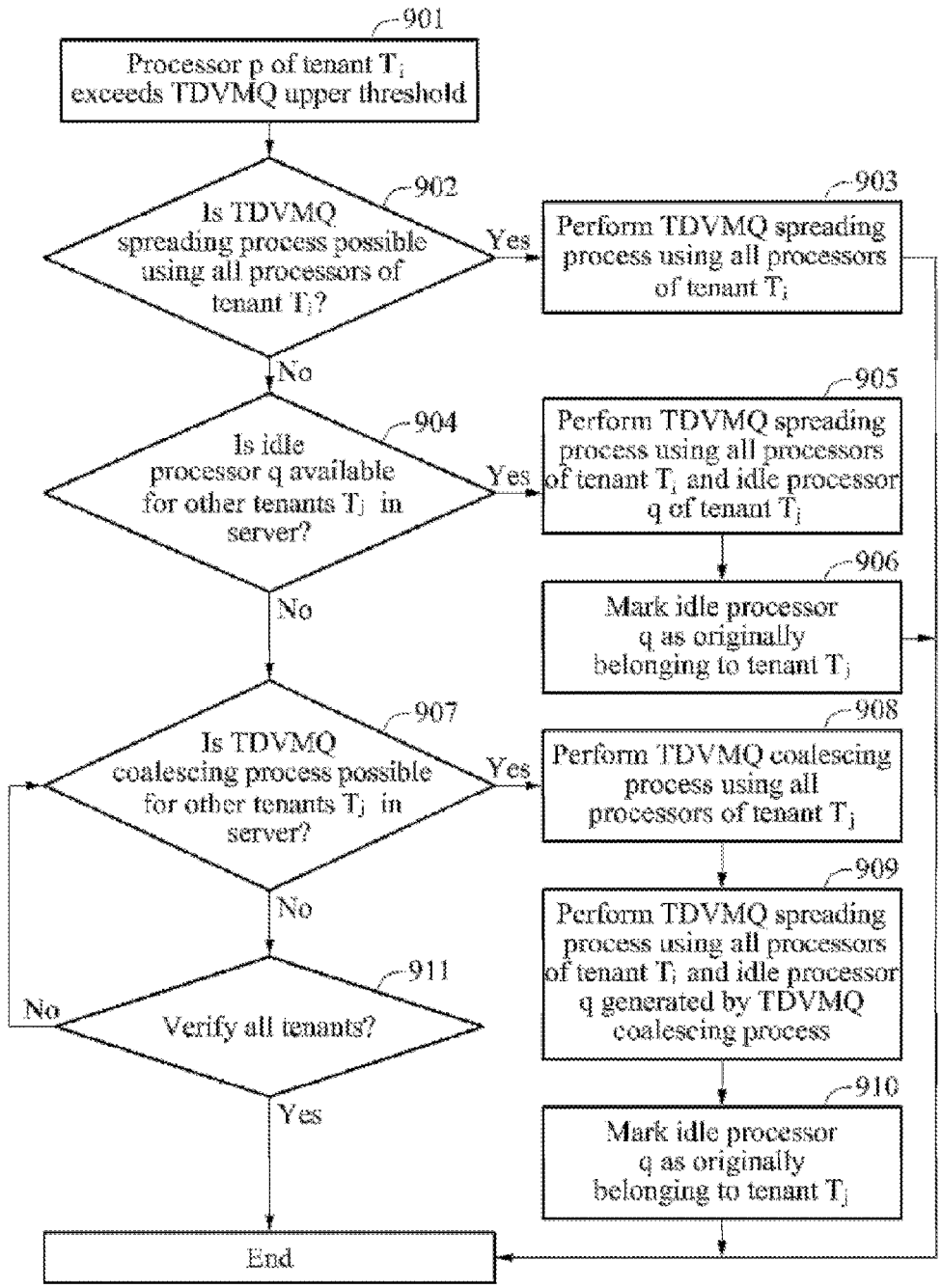
FIG. 9 is a flowchart illustrating a TDVMQ spreading process according to an embodiment of the present invention.

FIG. 9 is a flowchart illustrating a TDVMQ spreading process according to an embodiment of the present invention.

Referring to FIG. 9, in operation 901, due to an increase in traffic transmitted to VMs belonging to a tenant $T_i$, a processor p to process a corresponding VMQ may exceed a TDVMQ upper threshold.

In operation 902, it may be verified whether TDVMQ spreading is possible using all processors to process VMQs belonging to the tenant $T_i$.

When TDVMQ spreading is possible using all the processors to process the VMQs belonging to the tenant $T_i$, a TDVMQ spreading process may be performed using all the processors to process the VMQs belonging to the tenant $T_i$ in operation 903, and then the TDVMQ spreading process may be finished.

When the TDVMQ spreading process is impossible using all the processors to process the VMQs belonging to the tenant $T_i$, it may be verified whether an idle processor q is available for all other tenants in the server in operation 904.

As a result of verifying whether the idle processors q is available for the other tenants in operation 904, when the idle processor q to process a VMQ belonging to a tenant $T_j$ is available, the TDVMQ spreading process may be performed using all the processors to process the VMQs belonging to the tenant $T_i$ and the idle processor q to process the VMQ belonging to the tenant $T_j$.

In operation 906, the idle processor q to process the VMQ belonging to the tenant $T_j$ may be marked as originally belonging to the tenant $T_j$ and the TDVMQ spreading process may be finished.

When the TDVMQ spreading process is impossible using all the processors to process the VMQs belonging to the tenant $T_i$ in operation 902 and the idle processor q is unavailable for all the other tenants in the server in operation 904, it may be verified whether the TDVMQ coalescing process is possible for all tenants in the server in operation 907.

When the TDVMQ coalescing process is possible for the tenant $T_j$, the TDVMQ coalescing process may be performed using all processors to process VMQs belonging to tenant $T_j$ in operation 908.

In operation 909, the TDVMQ spreading process may be performed using the processor q of the tenant $T_j$, which becomes an idle processor as a result of performing the TDVMQ coalescing process, and all the processors to process the VMQs belonging to the tenant $T_i$.

In operation 910, the idle processor q to process the VMQ belonging to the tenant $T_j$ may be marked as originally belonging to the tenant $T_j$ and the TDVMQ spreading process may be finished.

As a result of verification in operation 907, when the TDVMQ coalescing process is impossible for all the tenants $T_j$ in the server, it may be checked whether verification is performed for all the tenants and the TDVMQ spreading process may be finished.

FIGS. 10A to 12C illustrate structures subjected to the TDVMQ spreading process according to other embodiments.

Figure 10A:
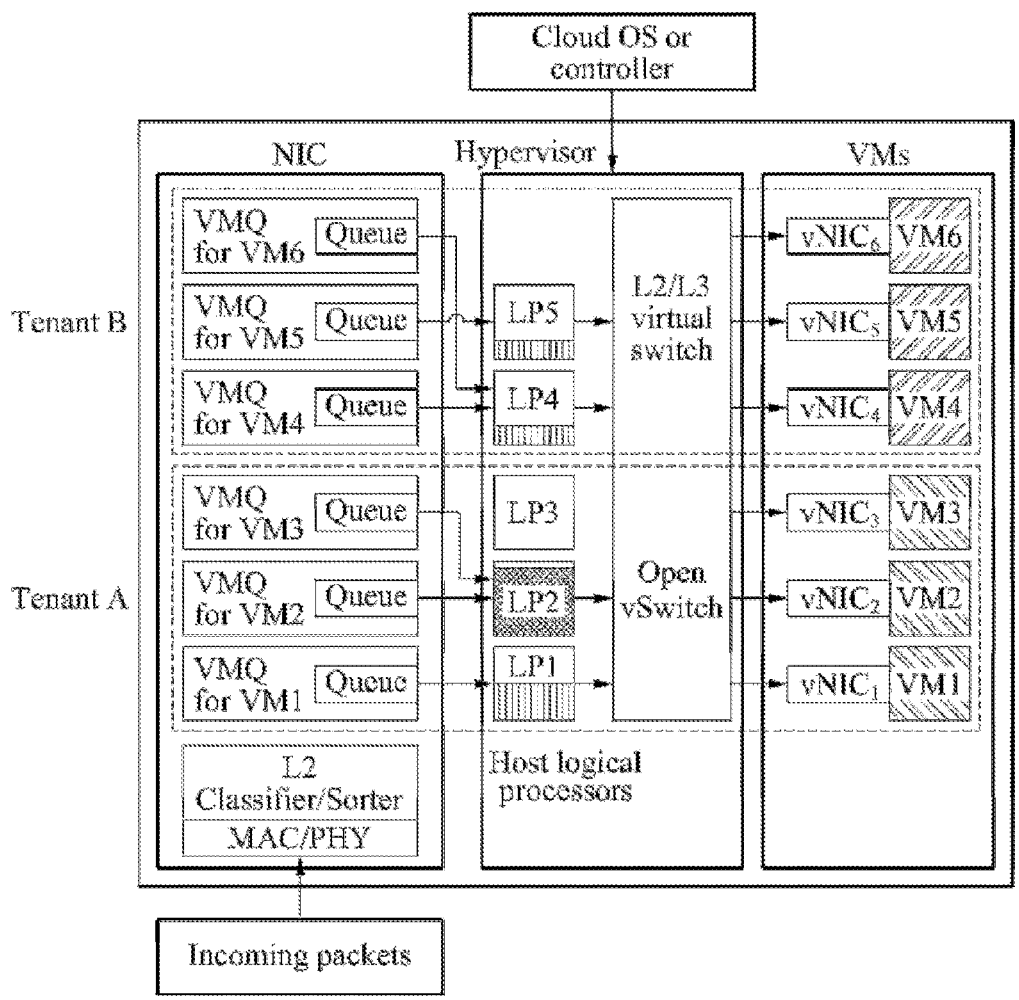
FIGS. 10A and 10B illustrate a state change when a TDVMQ spreading process is performed according to an embodiment of the present invention.

FIG. 10A illustrates that traffic congestion occurs to LP2. When the TDVMQ spreading process according to the embodiment of the present invention is applied to a structure illustrated in FIG. 10A, spreading is possible within tenant A. Accordingly, spreading may be performed within tenant A according to operations 901 to 903 of the TDVMQ spreading process of FIG. 9.

Figure 10B:
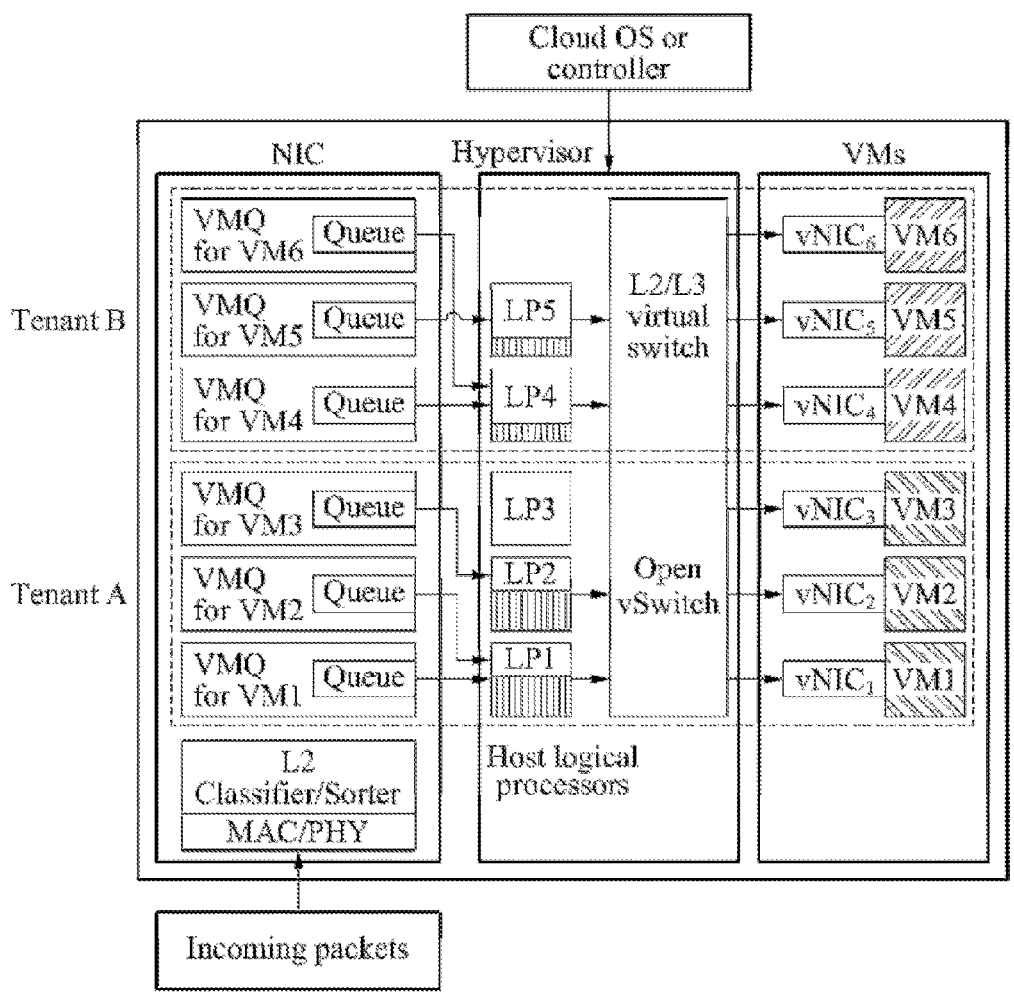

FIG. 10B illustrates a processor spreading structure within tenant A with respect to FIG. 10A according to the TDVMQ spreading process.

Figure 11A:
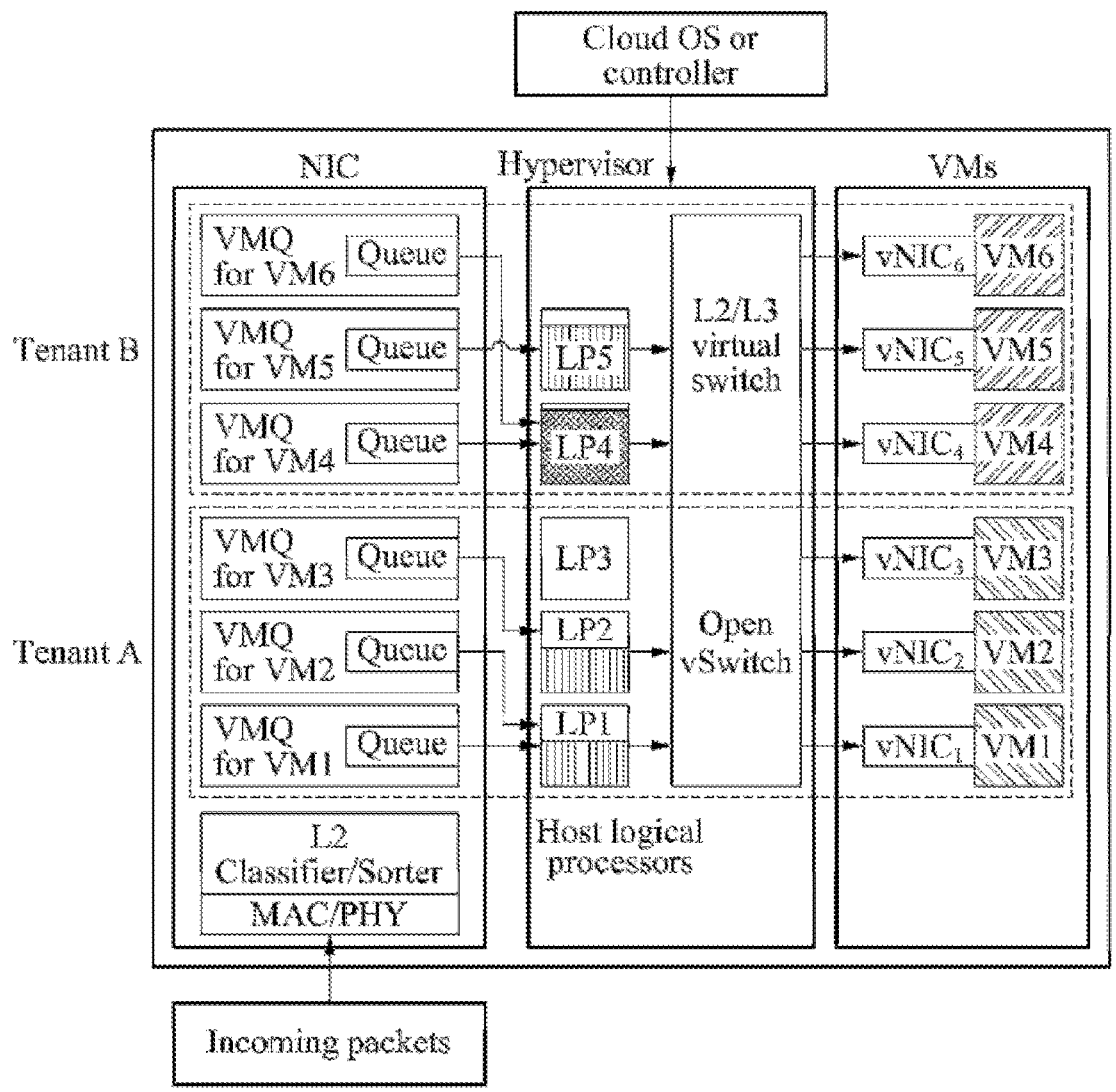
FIGS. 11A and 11B illustrate that a TDVMQ spreading process is performed according to another embodiment of the present invention.

FIG. 11A illustrates that traffic congestion occurs to LP4. When the TDVMQ spreading process is applied to a structure illustrated in FIG. 11A, spreading is impossible within tenant B. Accordingly, LP3 of tenant A is available according to the TDVMQ spreading process. Tenant B may be spread using LP3 of tenant A according to operations 904 to 906 of the TDVMQ spreading process of FIG. 9.

Figure 11B:
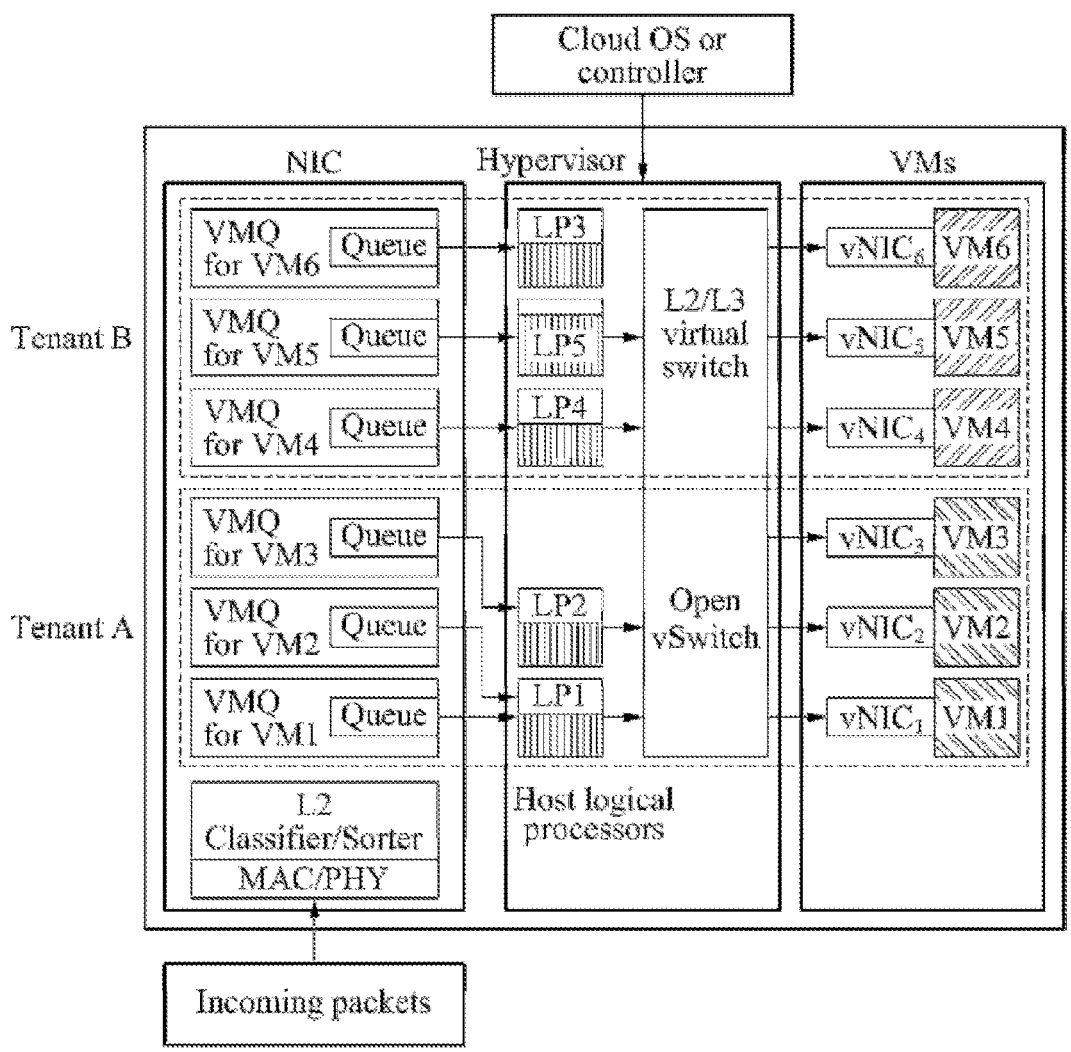

FIG. 11B illustrates a spreading structure for tenant B using LP3 of tenant A according to the TDVMQ spreading process.

Figure 12A:
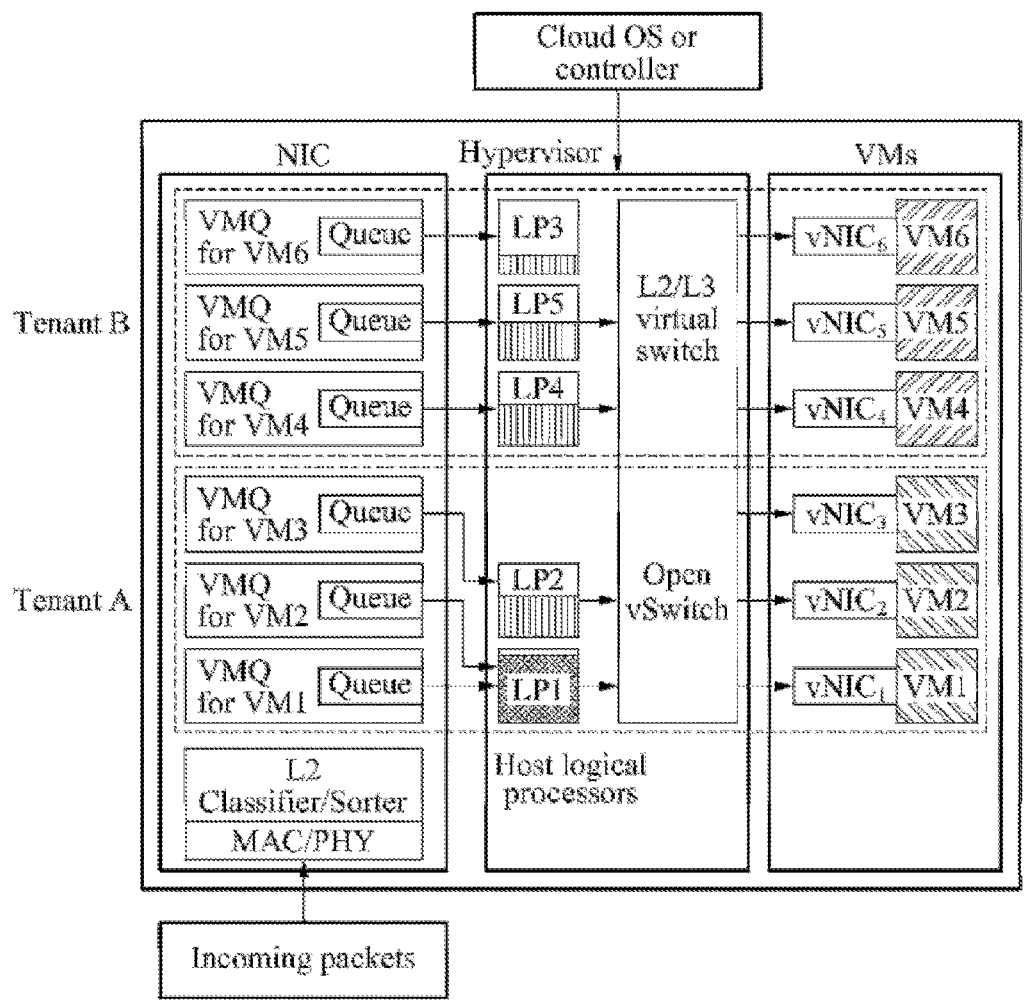
FIGS. 12A, 12B and 12C illustrate that a TDVMQ spreading process is performed according to still another embodiment of the present invention.

FIG. 12A illustrates that traffic congestion occurs to LP1. In a structure in this embodiment, spreading is impossible within tenant A and tenant B includes no available processor. Accordingly, a coalescing process is performed on tenant B by applying the TDVMQ spreading process according to the embodiment of the present invention, thereby generating an available processor in tenant B.

Tenant A may be spread using LP3 of tenant B according to operations 907 to 910 of the TDVMQ spreading process illustrated in FIG. 9.

Figure 12B:
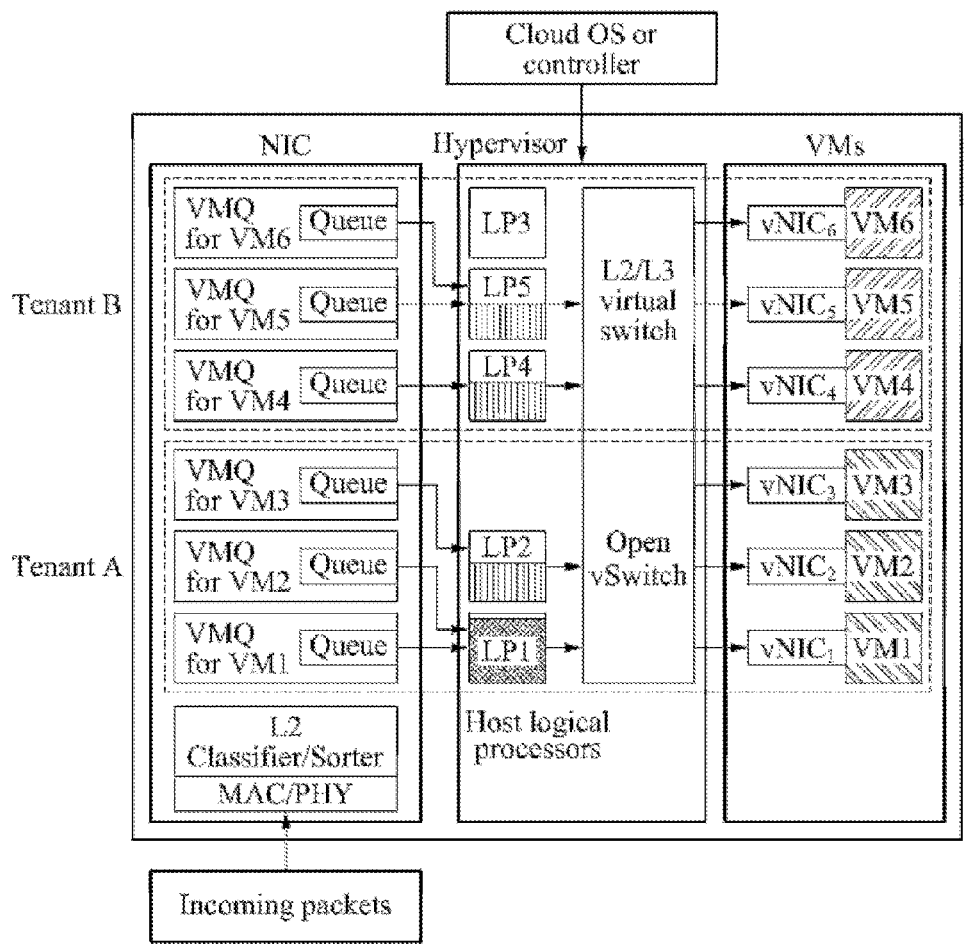
Figure 12C:
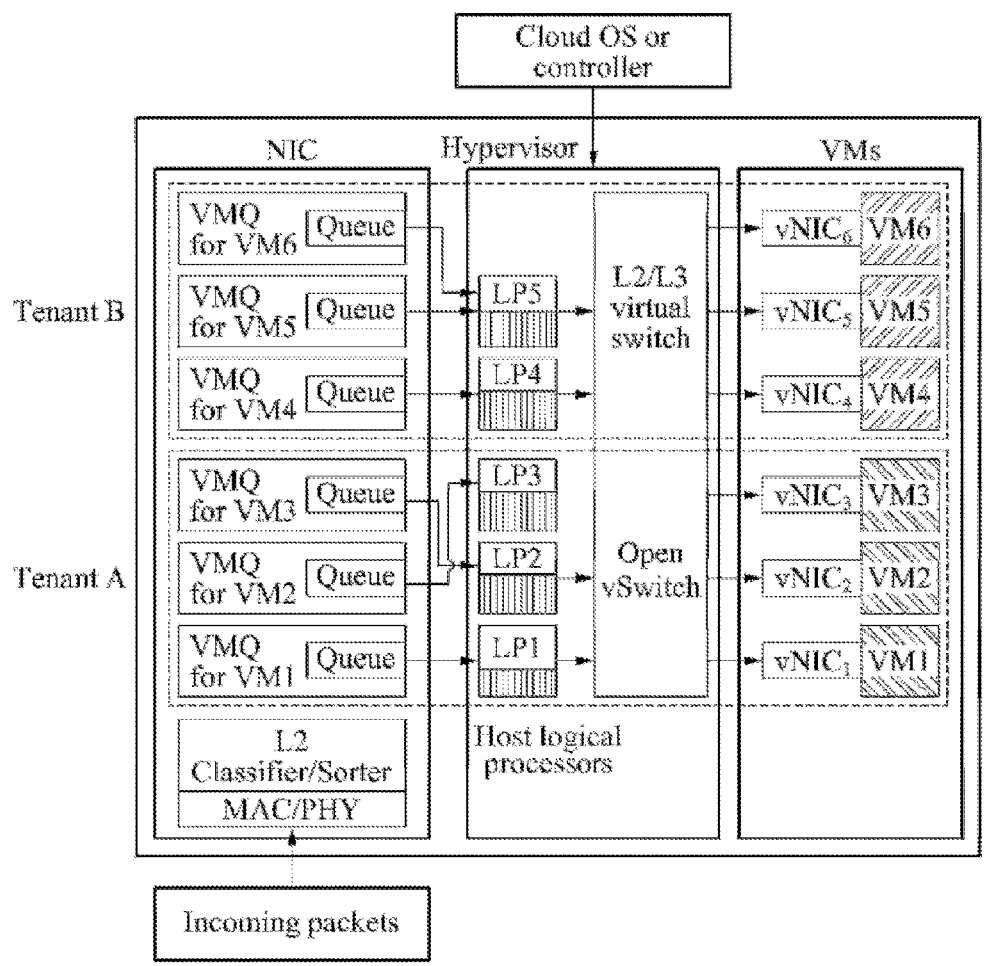

FIG. 12B illustrates a structure obtained after tenant B is subjected to the coalescing process according to the TDVMQ spreading process, and FIG. 12C illustrates a tenant A spreading structure using LP3.

In the present invention, when spreading is possible within the same tenant, an available processor is present in another tenant or the coalescing process is performed on another tenant, spreading may be allowed if the available processor is present and spreading beyond a tenant may not be allowed otherwise.

Figure 13:
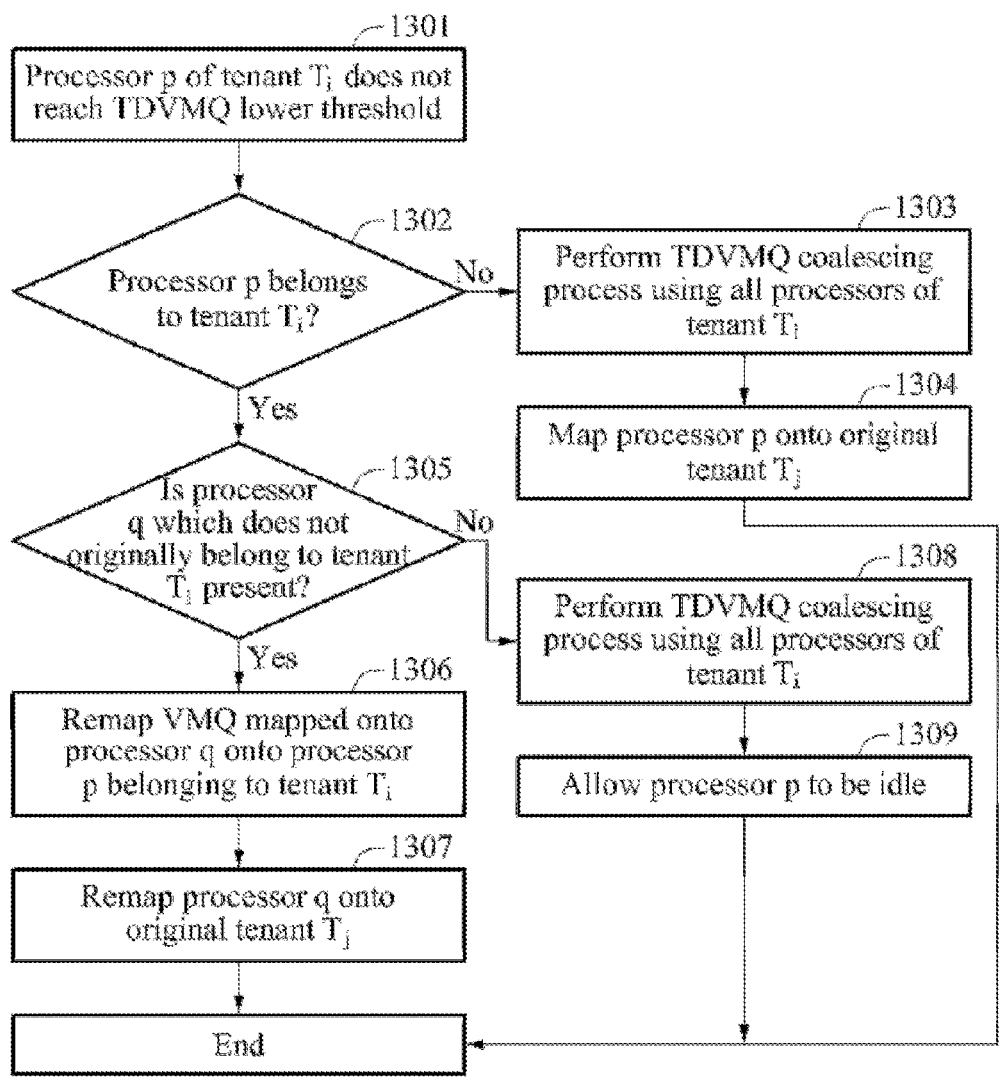
FIG. 13 is a flowchart illustrating a TDVMQ coalescing process according to an embodiment of the present invention.

FIG. 13 is a flowchart illustrating a TDVMQ coalescing process according to an embodiment of the present invention.

For minimization of power consumption, when traffic use of VMs belonging to one tenant decreases so that a reduction in the number of processors belonging to the same tenant is possible, VMQs and processors to process the VMQs may dynamically mapped onto each other so that another tenant may use the processors.

Referring to FIG. 13, in operation 1301, due to a decrease in traffic transmitted to VMs belonging to a tenant $T_i$, a processor p to process a corresponding VMQ may not reach a TDVMQ lower threshold.

In operation 1302, it may be verified whether the processor p is a processor which originally processes a VMQ belonging to a tenant $T_i$.

When it is determined that the processor p is not the processor which originally processes the VMQ belonging to the tenant $T_i$ in operation 1302, the TDVMQ coalescing process may be performed on the tenant $T_i$ using all processors to process VMQs belonging to the tenant $T_i$ in operation 1303.

In operation 1304, the processor p may be mapped onto the tenant $T_j$ to which the processor p originally belongs, and the TDVMQ coalescing process may be finished.

When it is determined that the processor p is the processor which originally processes the VMQ belonging to the tenant $T_i$ in operation 1302, it may be verified whether a processor q which does not originally belong to the tenant $T_i$ is present among the processors to process the VMQs belonging to the tenant $T_i$ in operation 1305.

When the processor q which does not originally belong to the tenant $T_i$ is present in operation 1305, all VMQs mapped onto the processor q which does not originally belong to the tenant $T_i$ may be remapped onto the processor p to process the VMQ originally belonging to the tenant $T_i$ in operation 1306.

In operation 1307, the processor q may be remapped onto the tenant $T_j$ to which the processor q originally belongs, and the TDVMQ coalescing process may be finished.

When the processor q which does not originally belong to the tenant $T_i$ is absent in operation 1305, the TDVMQ coalescing process may be performed using all the processors to process the VMQs belonging to the tenant $T_i$ in operation 1308.

In operation 1309, the processor p is allowed to be idle, and the TDVMQ coalescing process may be finished.

FIGS. 14A to 16B illustrate structures subjected to the TDVMQ coalescing process according to other embodiments of the present invention.

Figure 14A:
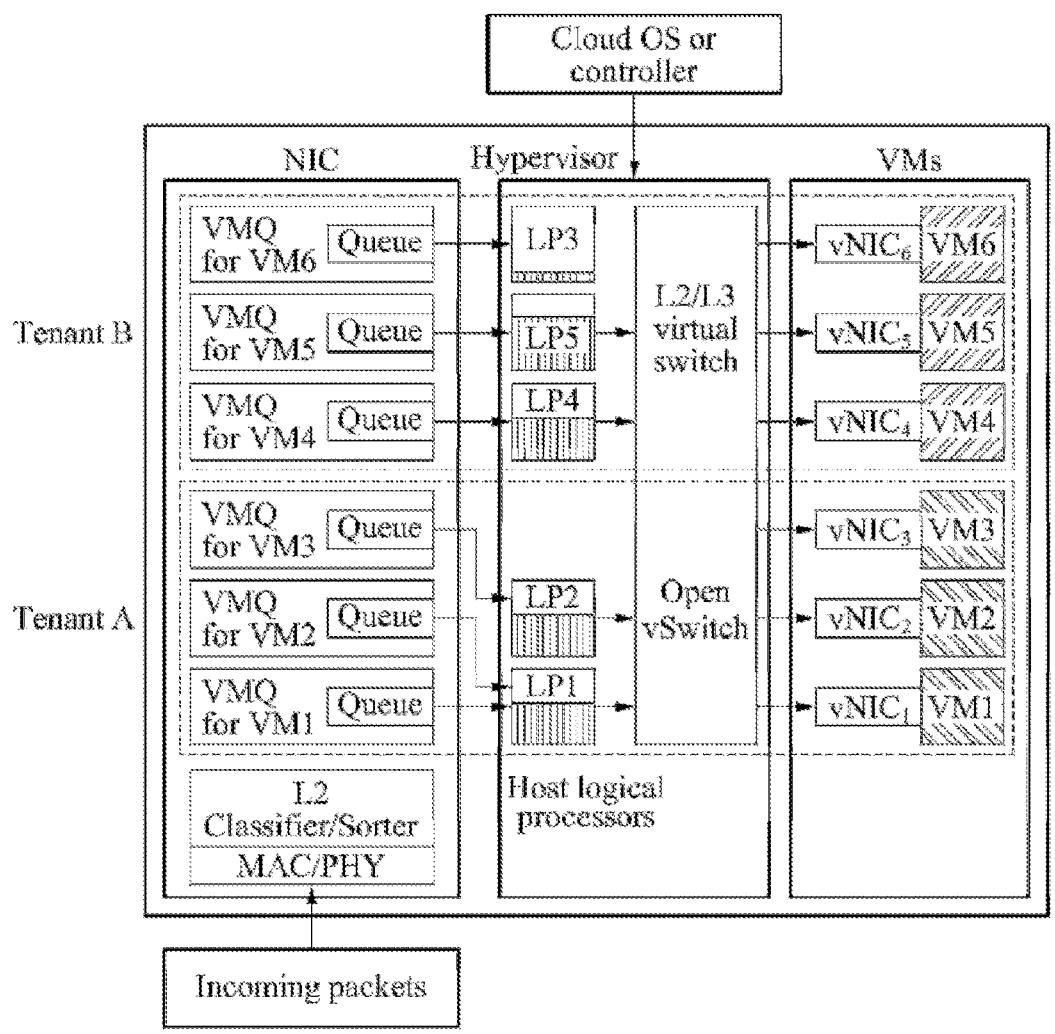
FIGS. 14A and 14B illustrate a state change when a TDVMQ coalescing process is performed according to an embodiment of the present invention.

FIG. 14A illustrates a case where the TDVMQ coalescing process is possible for LP3 due to a gradual decrease in traffic of tenant B. In the case of FIG. 14A, the TDVMQ coalescing process may be performed using processors LP4 and LP5 originally belonging to tenant B according to operations 1302 to 1304 illustrated in FIG. 13, and processor LP3 which does not originally belong to tenant B may be returned to tenant A to which LP3 originally belongs.

Figure 14B:
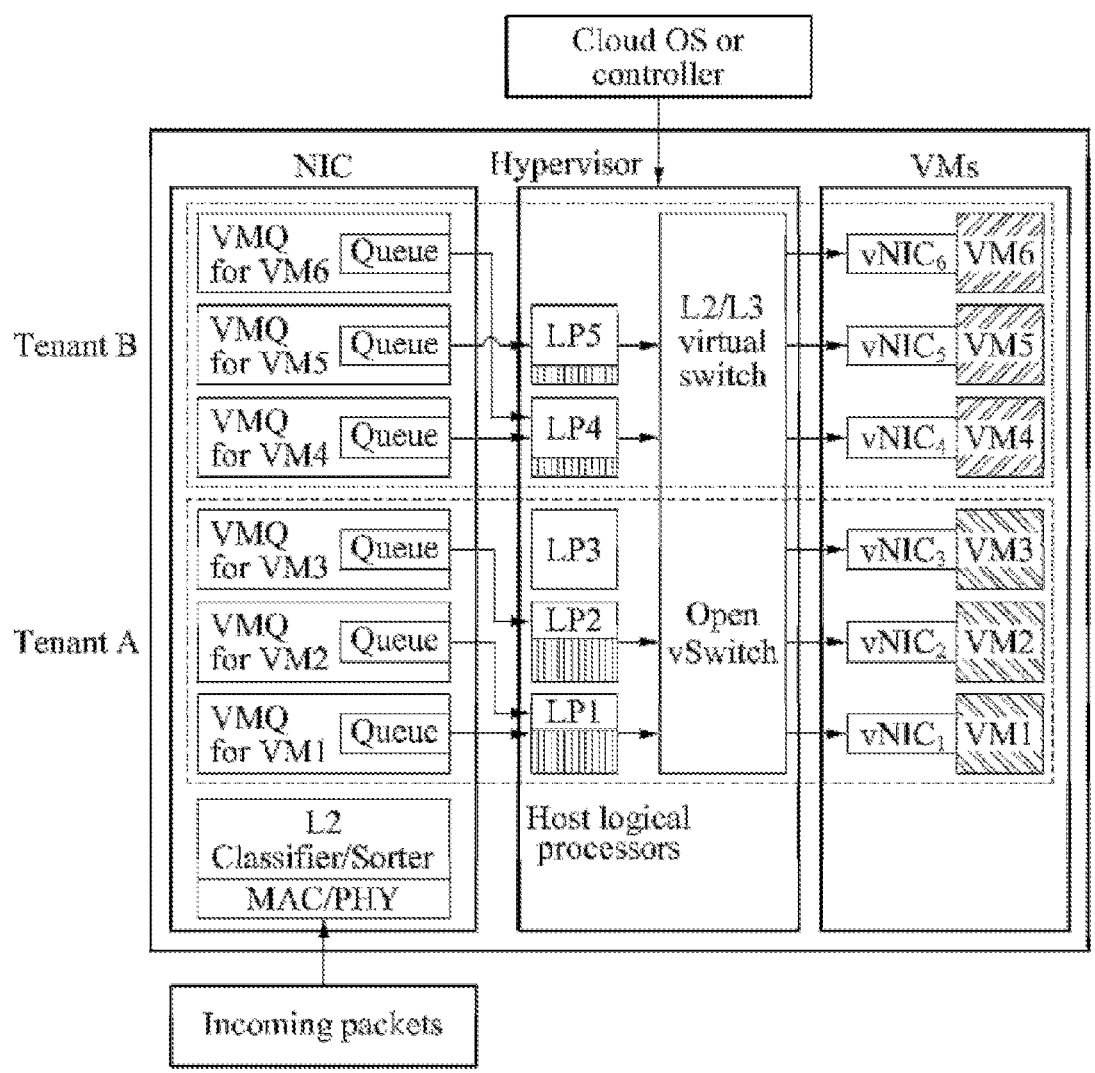

FIG. 14B illustrates a result of performing the TDVMQ coalescing process according to the flowchart. In this embodiment, the TDVMQ coalescing process may be finished.

Figure 15A:
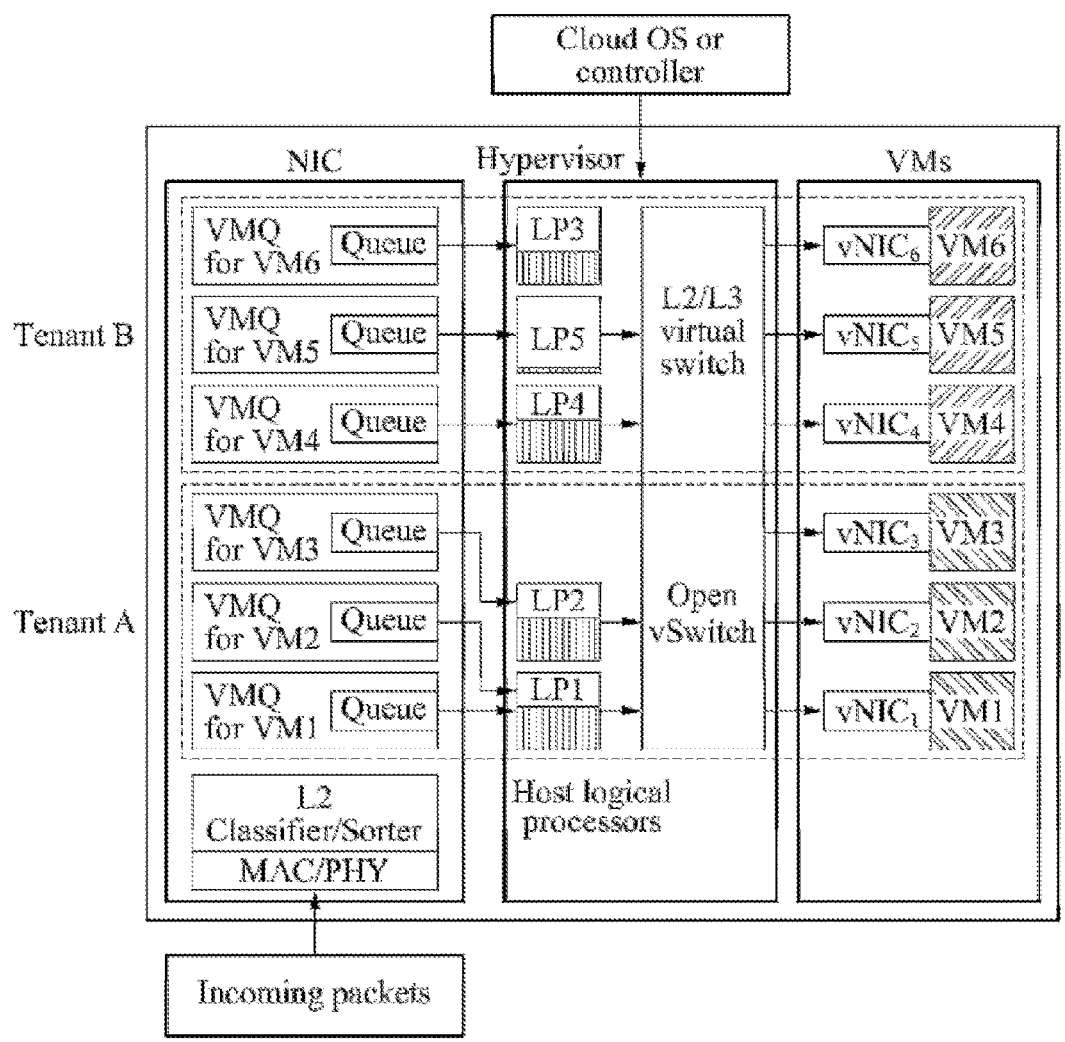
FIGS. 15A and 15B illustrate that a TDVMQ coalescing process is performed according to another embodiment of the present invention.

FIG. 15A illustrates a case where the TDVMQ coalescing process is possible for LP5 due to a gradual decrease in traffic of tenant B. In this situation, operations 1305 to 1307 illustrated in FIG. 13 may be performed. Thus, VMO6, mapped onto LP3 which does not originally belong to tenant B, may be mapped onto LP5, and processor LP3 which does not originally belong to tenant B may be returned to tenant A to which LP3 originally belongs.

Figure 15B:
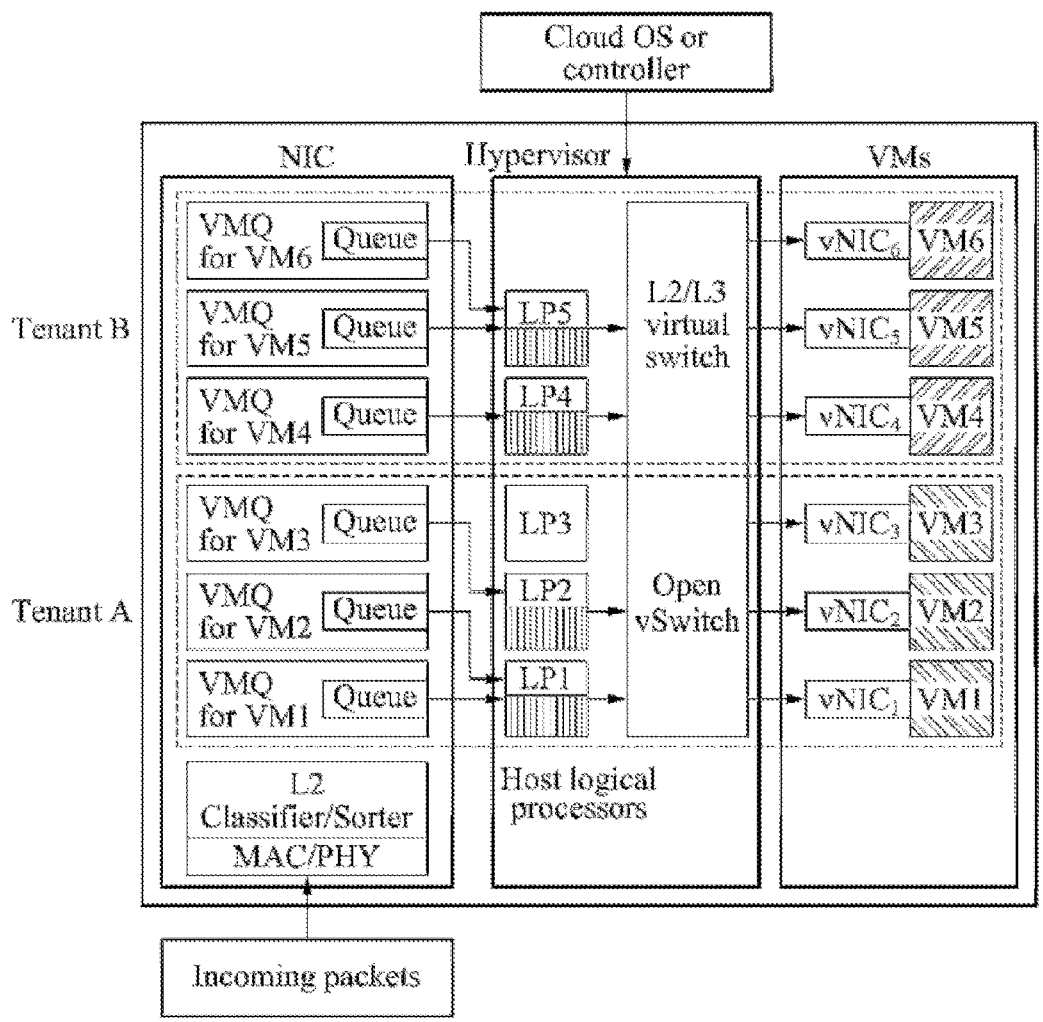

FIG. 15B illustrates a result of performing the TDVMQ coalescing process on FIG. 15A according to the flowchart.

Figure 16A:
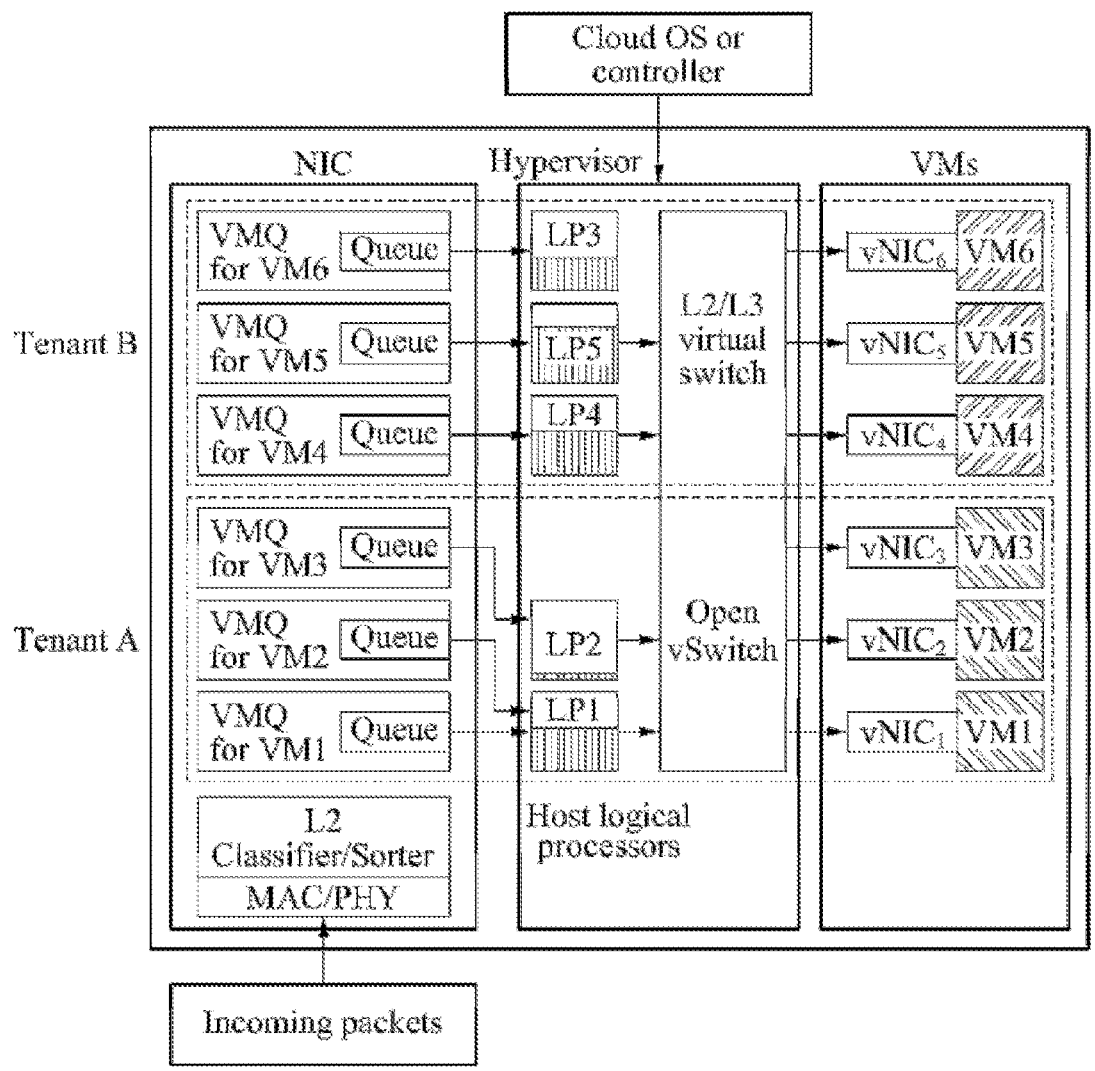
FIGS. 16A and 16B illustrate that a TDVMQ coalescing process is performed according to still another embodiment of the present invention.

Alternatively, FIG. 16A illustrates a case where the TDVMQ coalescing process is possible for LP2 due to a gradual decrease in traffic of tenant A. According to operations 1308 and 1309 of the TDVMQ coalescing process illustrated in FIG. 13, VMQ3 may be mapped onto LP1 which originally belongs to tenant A.

Figure 16B:
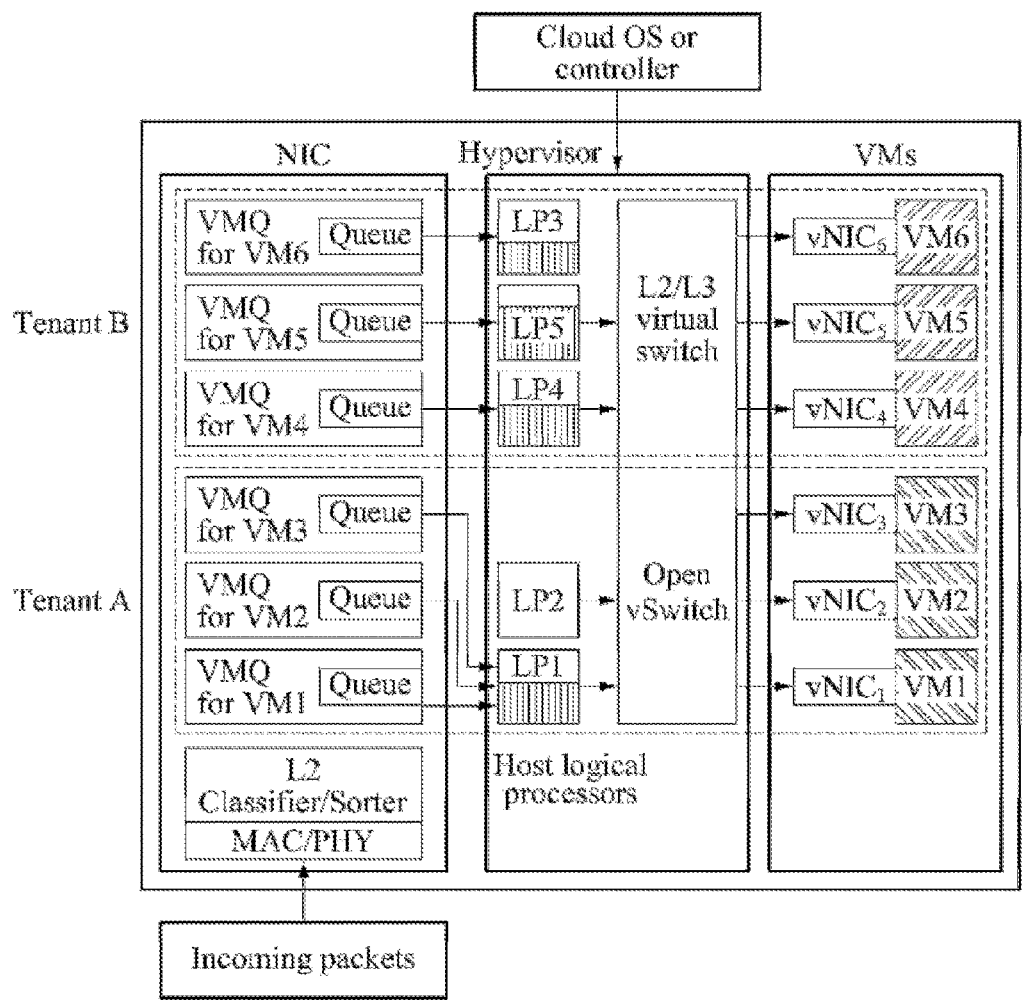

FIG. 16B illustrates a result of performing the TDVMQ coalescing process according to the flowchart.

According to the embodiments of the present invention, the foregoing problems of the conventional technology may be solved to provide a network virtualization method which ensures that network traffic processing of VMs belonging to the same tenant is not affected by congestion in network traffic belonging to a different tenant.

The above-described example embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments of the present invention, or vice versa.

While a few example embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A method of dynamically mapping a processor, the method comprising:
   extracting tenant information on a tenant and information on a virtual machine (VM) generated by a Cloud OS or controller;
   classifying virtual machine queues (VMQs) and processors to process the VMQs by tenant; and
   dynamically mapping the VMQs onto the processors by tenant,
   wherein dynamically mapping the VMQs onto the processors by tenant comprises dynamically allocating a number of processors to process the VMQs of a tenant based on a relative proportion of VMs or virtual CPUs of the VMs belonging to the tenant.

2. The method of claim 1, wherein the dynamically mapping of the VMQs onto the processors by tenant comprises dynamically mapping the processors to process the VMQs in proportion to a total number of VMs belonging to the same tenant.

3. The method of claim 1, wherein the dynamically mapping of the VMQs onto the processors by tenant comprises dynamically mapping the processors to process the VMQs in proportion to a total number of virtual CPUs of VMs belonging to the same tenant.

4. The method of claim 1, further comprising:
   generating an additional VM by the Cloud OS or controller;
   extracting additional tenant information on the additional VM and information on the additional VM; and dynamically remapping an additional VMQ onto a processor to process the additional VMQ based on the additional tenant information and the information on the additional VM.

5. The method of claim 4, wherein the dynamically remapping of the additional VMQ onto the processor to process the additional VMQ comprises dynamically mapping the processor to process the additional VMQ in proportion to a total number of additional VMs belonging to the same tenant.

6. The method of claim 4, wherein the dynamically remapping of the additional VMQ onto the processor to process the additional VMQ comprises dynamically mapping the processor to process the additional VMQ in proportional to a total number of virtual CPUs of additional VMs belonging to the same tenant.

7. The method of claim 4, further comprising:
identifying an incoming packet to transmit the packet to the additional VMQ; and
transmitting the packet by the remapped processor to process the VMQ to one or more additional VMs belonging to the same tenant.

8. The method of claim 1, further comprising, when at least one VM is deleted by the Cloud OS or controller,
extracting deleted tenant information and deleted VM information on the deleted VM; and
dynamically remapping the previously mapped VMQs onto the processors by tenant based on the deleted tenant information and the deleted VM information.

9. The method of claim 8, wherein the dynamically remapping of the previously mapped VMQs onto the processors by tenant comprises dynamically mapping the processors to process the VMQs in proportion to a total number of VMs belonging to the same tenant.

10. The method of claim 8, wherein the dynamically remapping of the previously mapped VMQs onto the processors by tenant comprises dynamically mapping the processors to process the VMQs in proportion to a total number of virtual CPUs of VMs belonging to the same tenant.

11. The method of claim 8, further comprising:
identifying an incoming packet to transmit the packet to the mapped VMQs; and
transmitting the packet by the remapped processors to process the VMQs to VMs belonging to the same tenant.

12. The method of claim 1, wherein when the processors are impossible to operate due to an increase in traffic use of a VM belonging to at least one tenant, the dynamically mapping of the VMQs onto the processors by tenant comprises dynamically mapping a VMQ and a processor not used by at least one different tenant other than the tenant to which the processors impossible to operate belong.

13. The method of claim 12, wherein the dynamically mapping of the VMQ and the processor not used by the different tenant other than the tenant which the processors impossible to operate belong to comprises verifying whether a tenant-based Dynamic Virtual Machine Queue (TDVMQ) spreading process is possible using all processors to process VMQs belonging to the tenant which the processors impossible to operate belong to;
verifying whether an idle processor is available for the different tenant; and
verifying whether a TDVMQ coalescing process is possible for the different tenant.

14. The method of claim 13, wherein the verifying of whether the TDVMQ spreading process is available comprises performing the TDVMQ spreading process using all the processors when the TDVMQ spreading process is possible.

15. The method of claim 13, wherein the verifying of whether the idle processor is available for all the different tenant comprises performing the TDVMQ spreading process using a processor of at least one tenant to which the idle processor belongs and the idle processor; and generating a mark indicating that the idle processor belongs to the at least one tenant when the idle processor belonging to the at least one tenant among all the different tenant is available.

16. The method of claim 13, wherein the verifying of whether the TDVMQ coalescing process is possible for all the different tenant comprises performing the TDVMQ coalescing process using a processor of at least one tenant of all the different tenant; performing the TDVMQ coalescing process using a processor which becomes an idle processor as a result of performing the TDVMQ coalescing process and the processor; and generating a mark indicating that the processor which becomes the idle processor belongs to the at least one tenant when the TDVMQ coalescing process is possible in the at least one tenant.

17. The method of claim 12, wherein when traffic of the tenant to which the processors impossible to operate belong decreases to possibly reduce processors, the method further comprises verifying whether processors which do not reach a lower threshold belong to the tenant to which the processors impossible to operate belong; and verifying whether a processor belonging to the at least one different tenant is present among the processors of the tenant to which the processors impossible to operate belong.

18. The method of claim 17, wherein the verifying of whether the processors which do not reach the lower threshold belong to the tenant to which the processors impossible to operate belong comprises performing a TDVMQ coalescing process using the processors impossible to operate when the processors which do not reach the lower threshold do not belong to the tenant to which the processors impossible to operate belong; and mapping the processors which do not reach the lower threshold onto a tenant to which the processors originally belong.

19. The method of claim 17, wherein the verifying of whether the processor belonging to the at least one different tenant is present among the processors of the tenant to which the processors impossible to operate belong comprises remapping a VMQ belonging to the tenant to which the processors impossible to operate belong onto a processor of an original tenant; and
remapping the processor belonging to the different tenant onto an original tenant when the processor belonging to the different tenant is present.

20. The method of claim 17, wherein the verifying of whether the processor belonging to the at least one different tenant is present among the processors of the tenant to which the processors impossible to operate belong comprises performing a TDVMQ coalescing process using the processors impossible to operate when the processor belonging to the different tenant is absent.

* * * * *